(12) United States Patent
Yamasaki et al.

(10) Patent No.: US 9,212,405 B2
(45) Date of Patent: Dec. 15, 2015

(54) WIRE ROD, STEEL WIRE, AND MANUFACTURING METHOD THEREOF

(71) Applicant: Nippon Steel & Sumitomo Metal Corporation, Tokyo (JP)

(72) Inventors: Shingo Yamasaki, Tokyo (JP);
Toshiyuki Manabe, Tokyo (JP);
Daisuke Hirakami, Tokyo (JP);
Nariyasu Muroga, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 269 days.

(21) Appl. No.: 13/898,810

(22) Filed: May 21, 2013

(65) Prior Publication Data

US 2013/0263975 A1    Oct. 10, 2013

Related U.S. Application Data

(62) Division of application No. 13/142,473, filed as application No. PCT/JP2010/068363 on Oct. 19, 2010, now Pat. No. 8,470,099.

(30) Foreign Application Priority Data

Feb. 1, 2010    (JP) .................................. 2010-020185

(51) Int. Cl.
*C22C 38/02* (2006.01)
*C22C 38/04* (2006.01)
(Continued)

(52) U.S. Cl.
CPC ................ *C21D 9/525* (2013.01); *B21C 1/003* (2013.01); *B32B 15/013* (2013.01); *C21D 8/06* (2013.01); *C21D 9/52* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01);
(Continued)

(58) Field of Classification Search
None
See application file for complete search history.

(56) References Cited

U.S. PATENT DOCUMENTS

| | | | |
|---|---|---|---|
| 5,248,353 | A | 9/1993 | Nishida et al. |
| 2007/0277913 | A1 | 12/2007 | Kochi et al. |
| 2010/0239884 | A1 | 9/2010 | Manabe et al. |

FOREIGN PATENT DOCUMENTS

| | | | |
|---|---|---|---|
| JP | 5-295448 A | | 11/1993 |
| JP | 6-271937 A | | 9/1994 |

(Continued)

OTHER PUBLICATIONS

Machine-English translation of Japanese patent No. 2004-091912, Ofuji Yoshihiro et al., Mar. 25, 2004.*
(Continued)

*Primary Examiner* — Deborah Yee
(74) *Attorney, Agent, or Firm* — Birch, Stewart, Kolasch & Birch, LLP

(57) ABSTRACT

The present invention provides a wire rod with a composition at least including: C: 0.95-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; O: 10-40 ppm; and a balance including Fe and inevitable impurities, wherein 97% or more of an area in a cross-section perpendicular to the longitudinal direction of the wire rod is occupied by a pearlite, and 0.5% or less of an area in a central area in the cross-section and 0.5% or less of an area in a first surface layer area in the cross-section are occupied by a pro-eutectoid cementite.

19 Claims, 5 Drawing Sheets

(51) Int. Cl.
   *C21D 8/06* (2006.01)
   *C21D 9/52* (2006.01)
   *C22C 38/00* (2006.01)
   *C22C 38/06* (2006.01)
   *C22C 38/18* (2006.01)
   *C22C 38/08* (2006.01)
   *C22C 38/10* (2006.01)
   *C22C 38/12* (2006.01)
   *C22C 38/14* (2006.01)
   *C22C 38/16* (2006.01)
   *B32B 15/01* (2006.01)
   *B21C 1/00* (2006.01)

(52) U.S. Cl.
   CPC ............... *C22C 38/12* (2013.01); *C22C 38/14* (2013.01); *C22C 38/16* (2013.01); *C22C 38/18* (2013.01); *C21D 2211/009* (2013.01)

(56) References Cited

FOREIGN PATENT DOCUMENTS

| JP | 8-283867 A | 10/1996 |
|----|------------|---------|
| JP | 2609387 B2 | 5/1997 |
| JP | 2735647 B2 | 4/1998 |
| JP | 2939770 B2 | 8/1999 |
| JP | 11-315349 | 11/1999 |
| JP | 2003-193129 A | 7/2003 |
| JP | 2004-91912 A | 3/2004 |
| JP | 2007-327084 A | 12/2007 |
| JP | 2008-208450 A | 9/2008 |
| WO | WO 2008/093466 A1 | 8/2008 |

OTHER PUBLICATIONS

Machine-English translation of Japanese patent No. 11-315349, Namimura Yuichi et al., Nov. 16, 1999.*
Machine English translation of Japanese Patent No. 11-315349, Namimura Yuichi et al., Nov. 16, 1999.
Non-Final Office Action dated Oct. 25, 2012, issued in U.S. Appl. No. 13/142,473.
Notice of Allowance dated Feb. 22, 2013 issued in U.S. Appl. No. 13/142,473.
Kalpakjian S. and Schmid S., Manufacturing, Engineering and Technology; Pearson Education, Chapter 2, pp. 77-78, Mexico, 2002 with English language translation.
Lifeng Zhang and Brian G. Thomas, "Inclusions in Continuous Casting of Steel", XXIV National Steelmaking Symposium, Morelia, Mich, Mexico, Nov. 26-28, 2003, pp. 138-183.
Mexican Office Action for Application No. MX/a/2011/008034, dated Dec. 5, 2013 with English language translation.

* cited by examiner

WIRE ROD, STEEL WIRE, AND MANUFACTURING METHOD THEREOF

This application is a Divisional application of U.S. patent application Ser. No. 13/142,473, filed Jun. 28, 2011 now U.S. Pat. No. 8,470,099, which is the U.S. National Phase of PCT/JP2010/068363, filed Oct. 19, 2010. Priority is claimed thereto under 35 U.S.C. §120. This application also claims priority under 35 U.S.C. §119(a) to Japanese Patent Application No. 2010-020185, filed in Japan on Feb. 1, 2010.

TECHNICAL FIELD

The present invention relates to a wire rod, a steel wire, and a manufacturing method thereof, and, more specifically, to a rolled wire rod preferable for use as a steel cord which is used as a reinforcement material in radial tires of automobiles or belts and hoses for a variety of industrial uses, a sawing wire, a PC steel wire, a zinc plated steel strand, a wire rod for springs, a cable for suspension bridges, or the like, a manufacturing method thereof, and a steel wire produced from the rolled wire rod.

BACKGROUND ART

Generally, a steel wire which is used for a sawing wire or a steel cord which is used as a reinforcement material for radial tires of automobiles, a variety of belts and hoses, or the like, is manufactured by subjecting a wire rod with a diameter of 5-6 mm, which has been hot-rolled and subjected to controlled-cooling, to a primary wire drawing so as to have a diameter of 3-4 mm, and subjecting the wire rod to a patenting treatment and a secondary wire drawing so as to have a diameter of 1-2 mm, and then subjecting the wire rod to a final patenting treatment, brass plating, and a final wet wire drawing process so as to have a diameter of 0.15-0.40 mm.

A steel cord is manufactured by twisting together a plurality of the ultrafine steel wires which obtained in the above manner in a twisting process so as to produce a twisted steel wire.

In general, if a wire is broken when processing a wire rod into a steel wire or twisting a steel wire, productivity and yield rate are significantly degraded. Therefore, there is a strong demand for wire rods or steel wires belonging to the above technical fields to not be broken during the wire drawing process or the twisting process. Among wire drawing processes, in the case of the final wet wire drawing process, since the diameter of a steel wire to be treated is extremely small, the steel wire is highly likely to be broken. Furthermore, in recent years, there has been a trend towards reducing the weight of steel cords or the like for a variety of purposes. As a result, there is a demand for a high strength in the variety of products described above.

In addition, a steel wire used as a PC steel wire, a PC twisted wire, a rope, a PWS wire for bridges, or the like is generally formed into a strand shape by subjecting a wire rod with a diameter of 5-16 mm, which has been subjected to hot rolling and then controlled cooling, to a wire drawing process so as to have a diameter of 2-8 mm, subjecting the rod to molten zinc plating after the wire drawing or in the middle of the wire drawing, according to necessity, and then stranding the rods with or without twisting them together.

Generally, if a wire is broken when processing a wire rod into a steel wire or longitudinal cracks (delamination) occur when twisting the steel wire, productivity and yield rate are significantly degraded. Therefore, there is a strong demand for wire rods or steel wires belonging to the above technical fields to not break during a wire drawing process or a stranding process.

With regard to such products, there was a demand in the past to secure a strength of 1600 MPa or higher as well as to secure sufficient performance in terms of toughness and ductility evaluated by a twisting test or the like, but, in recent years, there has been a trend in which the weight of wires has been reduced for a variety of purposes.

As a result, there is a demand for high strength in a variety of the above products, but it has become impossible to obtain the desired high strength in carbon steel wire rods with a C content of less than 0.9 mass %. Therefore, there has been an increasing demand for steel wires with a C content of 0.9 mass % or higher. However, if the amount of C is increased, since wire drawing properties or torsional properties (delamination resistance) are degraded due to generation of pro-eutectoid cementite (hereinafter, sometimes referred to as 'pro-eutectoid θ'), wires break more often. As a result, wire rods not only including high amount of C for obtaining high strength but also having excellent wire drawing properties are strongly demanded.

With respect to such recent demands from industries, manufacturing technologies of high carbon wire rods with an amount of C exceeding 1% have been suggested.

For example, Patent Document 1 discloses "a wire rod for high strength and high toughness ultrafine steel wires, a high strength and high toughness ultrafine steel wire, a twisted product using the ultrafine steel wire, and a manufacturing method of the ultrafine steel wire" made of a steel material having a specific chemical composition, in which the average area ratio containing pro-eutectoid cementite is defined. However, since the wire rod suggested in the publication includes one or both of Ni and Co, which are high-priced elements, as essential components, the manufacturing costs are increased.

Patent Document 2 suggests a technology in which 0.6% or more of Al is added so as to suppress generation of pro-eutectoid cementite in a high carbon steel with a content of C exceeding 1%. However, since Al is a strong deoxidizing element, and the amount of hard inclusions that act as a cause of wire breakage during wire drawing is increased, it is difficult to apply the technology to wire rods for steel wires with a small diameter, such as steel cords.

On the other hand, Patent Document 3 suggests a technology in which a high carbon wire rod is heated to an austenite temperature zone, cooled to a temperature range of 823-1023 K, subjected to a deforming process with a degree of 15-80% in the above temperature zone, and then isothermally transformed in a temperature zone of 823-923 K so as to suppress pro-eutectoid cementite. However, since a large facility investment is required to perform a predetermined process in such a temperature zone, there is concern of an increase in manufacturing costs.

RELATED ART DOCUMENT

Patent Document

[Patent Document 1] Japanese Patent No. 2609387
[Patent Document 2] Japanese Unexamined Patent Application, First Publication No. 2003-193129
[Patent Document 3] Japanese Unexamined Patent Application, First Publication No. H8-283867

DISCLOSURE OF THE INVENTION

Problems to be Solved by the Invention

The present invention has been made in consideration of the above circumstances, and the object of the invention is to provide, with high productivity as well as favorable yield rate at a low price, high strength wire rods that are preferable for use as a steel cord, a sawing wire, or use as a PC steel wire, a zinc plated steel strand, a steel wire for springs, a cable for suspension bridges, or the like, and are excellent in terms of wire drawing properties.

Means for Solving the Problems

In order to solve the above problems, the invention adopts the following configurations and methods.

(1) The first aspect of the invention is a wire rod with a composition including: C: 0.95-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; O: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities, wherein 97% or more of an area in a cross-section perpendicular to the longitudinal direction of the wire rod is occupied by a pearlite, and 0.5% or less of an area in a central area in the cross-section and 0.5% or less of an area in a first surface layer area in the cross-section are occupied by a pro-eutectoid cementite.

(2) In the wire rod described in the above (1), the cross-section of the wire rod may be occupied by the pearlite, the pro-eutectoid cementite, a bainite, a pseudo pearlite, a ferrite, a grain boundary ferrite, and a martensite.

(3) The second aspect of the invention is a manufacturing method of the wire rod described in the above (1) or (2). The manufacturing method includes a process in which a billet having the above composition is hot-rolled so as to obtain a rolled wire rod; a process in which the rolled wire rod is coiled; and a process in which a patenting treatment is performed by immersing the rolled wire rod of 900° C. or higher into a molten salt at a temperature of 500° C.-600° C.

(4) The third aspect of the invention is a manufacturing method of the wire rod described in the above (1) or (2). The manufacturing method includes a process in which a billet having the above composition is hot-rolled so as to obtain a rolled wire rod; a process in which the rolled wire rod is coiled; and a process in which cooling is started with respect to the rolled wire rod of 900° C. or higher, cooling is performed in a controlled manner to make the cooling rate Y while cooling from 900° C. to 650° C. satisfy $$Y \geq \exp((C\% - 0.66)/0.12) \quad \text{(Formula 1)}$$

and a patenting treatment is performed by finishing pearlite transformation at a temperature of 650° C.-500° C.

(5) The fourth aspect of the invention is a manufacturing method of the wire rod described in the above (1) or (2). The manufacturing method includes a process in which a rolled wire rod with the above composition and a diameter of 3-16 mm is prepared; a process in which the rod is reheated to 950° C.-1050° C.; and a process in which cooling is started with respect to the rolled wire rod of 900° C. or higher, and a patenting treatment is performed in a lead bath or a fluidized bed at a temperature of 500° C.-600° C.

(6) The fifth aspect of the invention is a steel wire obtained by performing at least once wire drawing and a reheating patenting treatment on a wire rod having the above composition with 97% or more of the area in cross-section perpendicular to the longitudinal direction of the wire rod occupied by a pearlite, and 0.5% or less of the area in the central area in cross-section and 0.5% or less of the area of a first surface layer area in cross-section occupied by a pro-eutectoid cementite, in which the steel wire has a diameter of 0.1-0.4 mm and a tensile strength of 4200 MPa or higher, and 0.5% or less of the area in the second surface layer area of the cross-section perpendicular to the longitudinal direction of the steel wire is occupied by pro-eutectoid cementite.

(7) The sixth aspect of the invention is a steel wire obtained by drawing a wire rod having the above composition with 97% or more of the area in cross-section perpendicular to the longitudinal direction of the wire rod occupied by a pearlite, and 0.5% or less of the area in the central area in cross-section and 0.5% or less of the area of a first surface layer area in cross-section occupied by a pro-eutectoid cementite, in which the steel wire has a diameter of 0.8-8 mm and a tensile strength of 1800 MPa or higher, and 0.5% or less of the area in the third surface layer area of the cross-section perpendicular to the longitudinal direction of the steel wire is occupied by pro-eutectoid cementite.

(8) The steel wire described in the above (7) may be obtained in a manner in which (a) the wire rod is drawn and then subjected to bluing, heat stretching, molten zinc plating, or molten zinc alloy plating, (b) the wire rod is molten zinc-plated or molten zinc alloy-plated and then drawn, or (c) the wire rod is drawn and then subjected to molten zinc plating or molten zinc alloy plating and, furthermore, is drawn.

(9) The seventh aspect of the invention is the manufacturing method of a steel wire described in the above (6) including a process in which a billet with the above composition is hot-rolled so as to manufacture a rolled wire rod, the rolled wire rod is coiled, a patenting treatment is performed by immersing the rolled wire rod of 900° C. or higher in a molten salt at a temperature of 500° C.-600° C. so as to manufacture a wire rod with a diameter of 3-7 mm; a process in which the wire rod is drawn; a process in which a second patenting treatment is performed by starting cooling by introducing the drawn rolled wire rod of 900° C. or higher to a lead bath or a fluidized bed at a temperature of 500° C.-600° C., and a process in which cold wire drawing is performed on the wire rod which has been subjected to the second patenting treatment.

(10) The eighth aspect of the invention is the manufacturing method of a steel wire described in the above (6) including a process in which a billet with the above composition is hot-rolled so as to manufacture a rolled wire rod, the rolled wire rod is coiled, cooling is started with respect to the rolled wire rod of 900° C. or higher, quenching is performed in a controlled manner to make the cooling rate Y while cooling from 900° C. to 650° C. satisfy $$Y \geq \exp((C\% - 0.66)/0.12) \quad \text{(Formula 1)}$$

and a patenting treatment is performed by finishing pearlite transformation at a temperature of 650° C.-500° C. so as to manufacture a wire rod with a diameter of 3-7 mm; a process in which the wire rod is drawn; a process in which a second patenting treatment is performed by starting cooling by introducing the drawn rolled wire rod of 900° C. or higher to a lead bath or a fluidized bed of 500° C.-600° C., and a process in which cold wire drawing is performed on the wire rod which has been subjected to the second patenting treatment.

(11) The ninth aspect of the invention is the manufacturing method of a steel wire described in the above (6) including a process in which a wire rod with the above composition and a diameter of 3-7 mm is reheated to a temperature of 950° C.-1050° C., cooling is started with respect to the reheated wire rod of 900° C. or higher, and a patenting treatment is performed in a lead bath or a fluidized bed at a temperature of 500° C.-600° C. so as to manufacture a wire rod with a diameter of 3-7 mm; a process in which the wire rod is drawn; a process in which a second patenting treatment is performed by starting cooling by introducing the drawn wire rod of 900° C. or higher to a lead bath or a fluidized bed at a temperature of 500° C.-600° C., and a process in which cold wire drawing is performed on the wire rod which has been subjected to the second patenting treatment.

(12) The tenth aspect of the invention is the manufacturing method of a steel wire described in the above (7) including a process in which a billet having the above composition is hot-rolled so as to manufacture a rolled wire rod, the rolled wire rod is coiled, and a patenting treatment is performed by immersing the rolled wire rod of 900° C. or higher into a molten salt at a temperature of 500° C.-600° C. so as to manufacture a wire rod with a diameter of 5-16 mm; and a process in which the wire rod is drawn.

(13) The tenth aspect of the invention is the manufacturing method of a steel wire described in the above (7) including a process in which a billet having the above composition is hot-rolled so as to manufacture a rolled wire rod, the rolled wire rod is coiled, cooling is started with respect to the rolled wire rod of 900° C. or higher, quenching is performed in a controlled manner to make the cooling rate Y while cooling from 900° C. to 650° C. satisfy $$Y \geq \exp((C\% - 0.66)/0.12) \quad \text{(Formula 1)}$$

and a patenting treatment is performed by finishing pearlite transformation at a temperature of 650° C.-500° C. so as to manufacture a wire rod with a diameter of 5-16 mm; and a process in which the wire rod is drawn.

(14) The tenth aspect of the invention is the manufacturing method of a steel wire described in the above (7) including a process in which a rolled wire rod with the above composition and a diameter of 5-16 mm is prepared and reheated to a temperature of 950° C.-1050° C., cooling is started with respect to the rolled wire rod of 900° C. or higher, and a patenting treatment is performed in a lead bath or a fluidized bed at a temperature of 500° C.-600° C. so as to manufacture a wire rod with a diameter of 5-16 mm; and a process in which the wire rod is drawn.

Effects of the Invention

According to the invention, it is possible to provide, with high productivity as well as favorable yield rate at a low price, high strength wire rods that are preferable for use as a steel cord, a sawing wire, a PC steel wire, a zinc plated steel strand, a steel wire for springs, a cable for suspension bridges, or the like, and are excellent in terms of wire drawing properties.

EMBODIMENTS OF THE INVENTION

The inventors of the present invention carried out repeated investigations and studies on the influence of the chemical compositions and mechanical properties of wire rods on the wire drawing properties and consequently obtained the following findings.

(a) It is preferable to increase the content of alloy elements, such as C, Si, Mn, Cr, or the like, to increase tensile strength. Particularly, it is possible to increase strength while maintaining high ductility of a steel wire by increasing the amount of C to 1 mass % or higher and relatively decreasing work strain for obtaining target strength.

Figure 1:
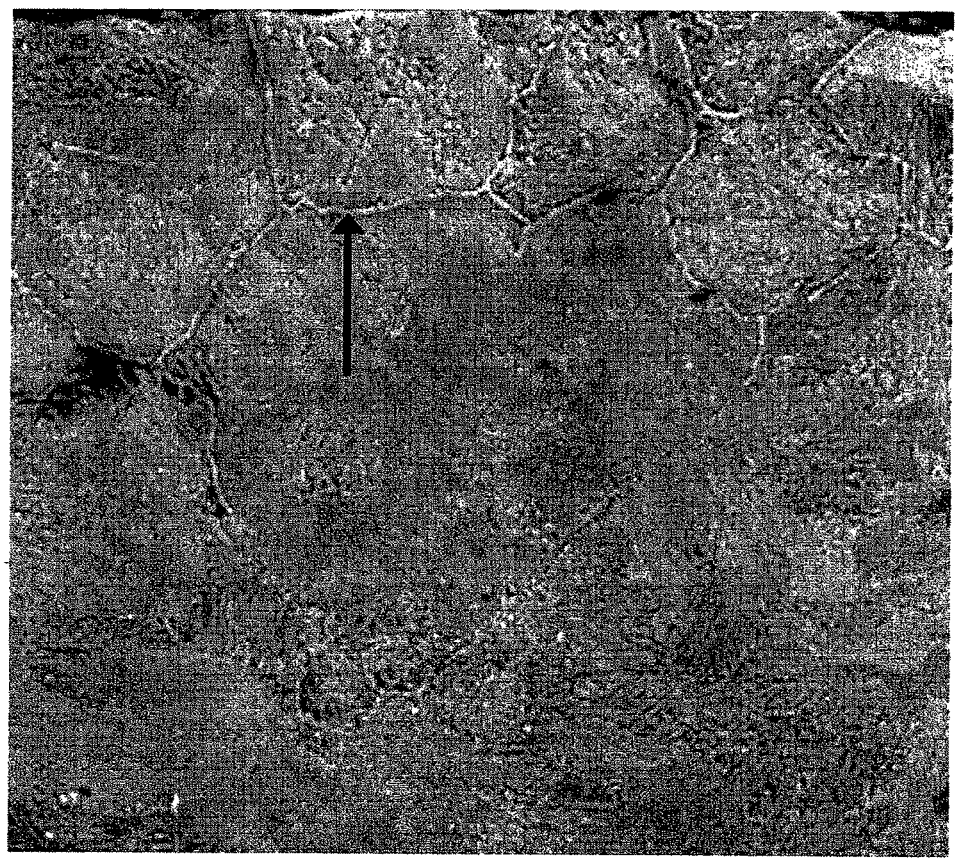
FIG. 1 shows an example of pro-eutectoid cementite generated in the surface layer area of a wire rod.

(b) If the amount of C is increased, pro-eutectoid cementite as shown by the arrow in FIG. 1 is liable to precipitate in overcooled austenite during the period from the start of cooling to the start of pearlite transformation in a cooling process from an austenite zone in a patenting treatment. This tendency becomes remarkable in the central area of a wire rod in which the cooling rate is decreased.

(c) It is possible to express, with a function of the C amount, the critical cooling rate at which the generation of pro-eutectoid cementite in the central area of a wire rod can be suppressed. It is possible to suppress generation of pro-eutectoid cementite in the central area of a wire rod at which the cooling rate is decreased, by cooling parent-phase austenite at a higher rate and subsequently performing an isothermal treatment.

(d) It is possible to obtain a cooling rate higher than the above critical cooling rate by immersing a wire rod with a content of C of 1.3 mass % or less and a diameter of 3-16 mm in molten salt after heating.

(e) In a general wire rod rolling line, a wire rod is coiled at a constant temperature after final rolling and then transported by a conveyor to a patenting treatment zone, such as a Stelmor or the like. In a reheating patenting line, there is no wire rod coiling process, but a certain amount of time is required to transport the wire rod from the exit side of a heating band to a cooling band for patenting. In a high C material with an amount of C exceeding 1 mass %, since the cementite precipitation temperature (a temperature where austenite becomes austenite+cementite) is high, in the conventional heating and transportation conditions, there are concern that the temperature in an area several tens of μm deep in the outermost surface layer of a wire rod which comes into contact with the atmosphere during transportation may be lowered, and pro-eutectoid cementite may be generated in the outermost surface layer of the wire rod before cooling for a patenting treatment is started.

(f) FIG. 1 shows an example of pro-eutectoid cementite generated in the surface layer area of a wire rod. Since such cementite in the surface layer has a brittle structure, this acts as a cause of surface layer cracks during wire drawing and a cause of the occurrence of delamination in a steel wire obtained by wire drawing, or the like, the ductility of a steel wire is remarkably degraded.

(g) In order to suppress such pro-eutectoid cementite in the outermost surface layer of a wire rod, it is necessary to set the cooling starting temperature of a wire rod for patenting to 900° C. or higher. For this, it is necessary to perform final rolling at 980° C. or higher, to set the temperature for coiling or reheating to 925° C. or higher, which is higher than that in the related art, and preferably to higher than 950° C., and to shorten the transportation time as possible or suppress the lowering of temperature during transportation.

(h) If the final rolling temperature and the coiling temperature are too high, since the grain diameter of austenite in a wire rod becomes coarsened and ductility is degraded, there is an upper limit temperature at which ductility can be secured.

Hereinafter, embodiments of the invention, which is derived from the above findings will be described in detail.

First Embodiment

Configuration of Wire Rods

The first embodiment of the invention is a wire rod in which 0.5% or less of the area in the central area in cross-section perpendicular to the longitudinal direction of the wire rod and 0.5% or less of the area of the surface layer area (the first surface layer area) in cross-section are occupied by a pro-eutectoid cementite.

According to studies by the inventors of the invention, there is a relationship between the ratio of pro-eutectoid cementite in the surface layer area of a wire rod and in the central area of the wire rod before wire drawing and the ductility of the steel wire obtained by drawing a wire rod, and, if it is possible to suppress the area ratio of cementite in the surface layer area of the wire rod, the ductility of the steel wire which can be obtained by drawing a wire rod is improved, and wire breakage during wire drawing can be suppressed by decreasing the area ratio of cementite in the central area of the wire rod to 0.5% or lower.

Here, the surface layer area (the first surface layer area) in the wire rod refers to an area corresponding to a depth of 50 μm from the surface of the wire rod (the circumferential portion in cross-section) in cross-section perpendicular to the longitudinal direction of the wire rod.

The central area in the wire rod refers to an area with a radius of 100 μm from the central point in cross-section perpendicular to the longitudinal direction of the wire rod.

The pro-eutectoid cementite refers to cementite with a small deformability, which is generated at the prior austenite grain boundary and has a thickness of 100 nm or larger.

In addition, the wire rod according to the present embodiment has 97% or more of the area in cross-section perpendicular to the longitudinal direction of the wire rod occupied by a pearlite. The remainder may be pro-eutectoid cementite, a bainite, a pseudo pearlite, a ferrite, a grain boundary ferrite, a martensite, or the like.

(Manufacturing Conditions of the Wire Rods)

In order to suppress pro-eutectoid cementite in the surface layer area of a rolled wire rod made of a material with a high C content of 0.95-1.3 mass % to the above area ratio, it is necessary to set the temperature of the wire rod to 900° C. or higher, and more preferably to 920° C. or higher, at the moment of starting cooling for patenting with a salt bath or a Stelmor when hot-rolling steel pieces (billets) to have a diameter of 3-16 mm. For that, it is desirable to perform final rolling at 980° C. or higher and to perform coiling at a temperature range higher than 925° C., and preferably higher than 950° C. If the temperature of final rolling and the temperature of coiling are too high, an austenite grain diameter in the wire rod becomes coarsened, and ductility (maximum drawable rate) is degraded. Therefore, it is desirable to set both the temperature of final rolling and the temperature of coiling to 1050° C. or lower.

The amount of pro-eutectoid cementitie generated in the central area of a wire rod is dependent on the cooling rate Y while cooling from 900° C. to 650° C. The inventors of the invention found that it is effective to quench a wire rod in a method in which the cooling rate Y [° C./s] and the amount of carbon in the wire rod C % [mass %] satisfy $$Y \geq \exp((C\% - 0.66)/0.12) \quad \text{(Formula 1)}$$

and then to finish pearlite transformation at a temperature of 500° C.-650° C.

It is desirable to perform the same measure even in the process of reheating patenting, which is performed on a steel wire before wire drawing or during wire drawing. The reheating patenting refers to a patenting treatment performed after putting a subject into a state of 200° C. or lower once and reheating it. In order to suppress pro-eutectoid cementite in the surface layer area or the central area of a reheating patenting steel wire made of a material with a high C content of 0.95-1.3 mass % to the above area ratio, it is effective to set the reheating temperature to 950° C.-1050° C., and desirably to from the higher temperature of 975° C. or higher and C %×450+450 (° C.) to 1050° C., to sufficiently form a solid solution of C and other alloy elements, to set the temperature of the steel wire when starting cooling for patenting to 900° C. or higher, and desirably to 920° C. or higher, and then to perform a patenting treatment in a lead bath or a fluidized bed at 500° C.-600° C.

(Basic Elements)

The wire rod according to the embodiment includes C, Si, Mn, Al, Ti, N, and O. Hereinafter, the amount of each component will be described.

C: 0.95-1.35 Mass %

C is an effective element for increasing the strength of a wire rod, and, if the content is less than 0.95%, it is difficult to stabilize and supply high strength to a final product. On the other hand, if the content of C is too high, net-shaped pro-eutectoid cementite is generated in austenite grain boundaries so that the wire is liable to be broken during a wire drawing process and also the toughness and ductility of the ultrafine wire rod after final wire drawing is remarkably degraded. As a result, the amount of C is defined as 0.95-1.30 mass %. In order to obtain a high-strength steel wire, the amount is set preferably to 1.0 mass % or more, and more preferably to 1.1 mass % or more.

Si: 0.1-1.5 Mass %

Si is an effective element for increasing the strength. In addition, Si is a useful element as a deoxidizing element and a necessary element when treating a steel wire rod including no Al. If the amount of Si is less than 0.1 mass %, a deoxidizing action is too low. On the other hand, if the amount of Si is too high, precipitation of pro-eutectoid ferrite is accelerated even in hypereutectoid steel, and the limit processability in a wire drawing process is degraded. Furthermore, it becomes difficult to perform a wire drawing process by mechanical descaling. Accordingly, the amount of Si is defined as 0.1-1.5 mass %. More preferably, the amount of Si is defined as 1.0 mass % or less, and more preferably as 0.35 mass % or less.

Mn: 0.1-1.0 Mass %

Similarly to Si, Mn is also a useful element as a deoxidizing agent. In addition, Mn is effective to improve hardenability and thus increase the strength of a wire rod. Furthermore, Mn is combined with S to form MnS, thereby preventing hot rolling brittleness. If the amount of Mn content is less than 0.1 mass %, it is difficult to obtain the above effects. On the other hand, Mn is an element liable to be segregated so that, if the Mn content exceeds 1.0 mass %, Mn is segregated particularly in the central area of a wire rod, and martensite or bainite is generated in the segregated portions, which leads to degradation of wire drawing processiblity. Accordingly, the amount of Mn is defined as 0.1-1.0 mass %.

Al: 0-0.1 Mass %

The amount of Al is defined as a range of 0.1 mass % or less including 0 mass % (or exceeding 0 mass %) in order to prevent generation of hard unmodified alumina-based non-metallic inclusions, which causes degradation in the ductility and wire drawing properties of a steel wire. The amount of Al is preferably 0.05 mass % or less, and more preferably 0.01 mass % or less.

Ti: 0-0.1 Mass %

The amount of Ti is defined as a range of 0.1 mass % or less including 0 mass % (or exceeding 0 mass) in order to prevent generation of hard unmodified oxides, which causes degradation in the ductility and wire drawing properties of a steel wire. The amount of Ti is preferably 0.05 mass % or less, and more preferably 0.01 mass % or less.

N: from 10 ppm to 50 ppm

N generates nitrides with Al, Ti, and B in a steel and has an action of preventing coarsening of the austenite grain size during heating, and the effect is effectively exhibited by including 10 ppm or more of N. However, if the N content is too high, the amount of nitrides increases excessively, and therefore the amount of solid-solute B in austenite is decreased. Furthermore, since there is concern that solid-solute N may accelerate aging during wire drawing, the upper limit is set to 50 ppm. More preferably, the amount of N is 30 ppm or less.

O: 10-40 ppm

O can form composite inclusions with Si and the like so as to form soft inclusions having no adverse effect on wire drawing properties. It is possible to finely disperse such soft inclusions after rolling, and thus there are effects of refining γ grain size by a pinning effect and of improving ductility of a patenting wire rod. Accordingly, the lower limit is defined as 10 ppm. However, if the O content is too high, since hard inclusions are formed, and wire drawing properties are degraded, the upper limit is defined as 40 ppm.

(Inevitable Impurities)

Further, although the contents of P and S which are included in the wire rod according to the embodiment as impurities are not particularly defined, from the viewpoint of securing ductility similar to that of an ultrafine steel wire in the related art, it is desirable to limit each to 0.02 mass % or less. Here, even when less than 0.0005 mass % of each of P and S are included, the effects are limited.

(Optional Elements)

In addition to the above elements, the wire rod according to the embodiment may further optionally include one kind or more of elements from Cr, Ni, Co, V, Cu, Nb, Mo, W, B, REM, Ca, Mg, and Zr for the purpose of improving mechanical properties, such as strength, toughness, ductility, or the like. Hereinafter, the amount of each component will be described.

Cr: 0-0.5 Mass %

Cr is an element that refines the lamella interval in pearlite and is effective to improve the strength, wire drawing processsibility or the like of a wire rod. In order to effectively exhibit such actions, it is preferable to add 0.1 mass % or more of Cr. On the other hand, if the amount of Cr is too high, since transformation completion time becomes long, there is concern that supercooled structures, such as martensite, bainite, or the like, may be generated in a hot-rolled wire rod, and mechanical descaling properties may deteriorate, thus, the upper limit is defined as 0.5 mass %.

Ni: 0-0.5 Mass %

Ni is an element that contributes little to an increase in the strength of a wire rod, but increases the toughness of a drawn wire rod. In order to effectively exhibit such an action, it is preferable to add 0.1 mass % or more of Ni. On the other hand, if Ni is excessively added, transformation completion time becomes long, thus, the upper limit is defined as 0.5 mass %.

Co: 0-0.5 Mass %

Co is an effective element that suppresses segregation of pro-eutectoid cementite in a rolled material. In order to effectively exhibit such an action, it is preferable to add 0.1 mass % or more of Co. On the other hand, even when Co is excessively added, the effect is saturated and thus no economic benefit is produced. Accordingly, the upper limit is defined as 0.5 mass %.

V: 0-0.5 Mass %

V forms fine carbonitrides in ferrite so as to prevent coarsening of autenite grains during heating and contributes to an increase in strength after rolling. In order to effectively exhibit such an action, it is preferable to add 0.05 mass % or more of V. However, if V is excessively added, the amount of carbonitrides becomes too large, and the grain diameter of carbonitrides becomes large, thus, the upper limit is defined as 0.5 mass %.

Cu: 0-0.5 Mass %

Cu has an effect of increasing the corrosion resistance of an ultrafine steel wire. In order to effectively exhibit such an action, it is preferable to add 0.1 mass % or more of Cu. However, if Cu is excessively added, Cu reacts with S so as to precipitate CuS, which causes defects in a steel ingot or a wire rod in the manufacturing process of a wire rod. In order to prevent such adverse effects, the upper limit is defined as 0.5 mass %.

Nb: 0-0.1 Mass %

Nb has an effect of increasing the corrosion resistance of ultrafine steel wires. In order to effectively exhibit such an action, it is preferable to add 0.05 mass % or more of Nb. On the other hand, if Nb is excessivley added, the transformation completion time becomes long. Thus, the upper limit of Nb is defined as 0.1 mass %.

Mo: 0-0.2 Mass %

Mo is concentrated in pearlite growth interfaces and has an effect of suppressing the growth of pearlite by a so-called solute drag effect. By adding an appropriate amount, it is possible to suppress the growth of pearlite only in a high temperature area of 600° C. or higher, and to suppress the generation of pearlite having coarse lamella spacing. In addition, Mo also has an effect of improving hardenability, with which the generation of ferrite is suppressed, and is also effective to reduce non-pearlite structures. If the amount of Mo is excessive, pearlite growth is suppressed across the entire temperature range so that a long time is required for patenting, which results in a decrease in productivity, and coarse $Mo_2C$ carbides are precipitated, and thus wire drawing properties are degraded. Accordingly, the amount of Mo is defined as 0.2 mass % or less. The preferable amount of Mo is 0.005-0.06 mass %.

W: 0-0.2 Mass %

Similarly to Mo, W is concentrated in pearlite growth interfaces and has an effect of suppressing the growth of pearlite by a so-called solute drag effect. By adding an appropriate amount, it is possible to suppress the growth of pearlite only in a high temperature area of 600° C. or higher, and to suppress the generation of pearlite in a coarse lamella spacing. In addition, W also has an effect of improving hardenability, with which the generation of ferrite is suppressed, and is also effective to reduce non-ferrite structures. If the amount of W is excessive, pearlite growth is suppressed across the entire temperature range so that a long time is required for patenting, which results in a decrease in productivity, and coarse $W_2C$ carbides are precipitated, and thus wire drawing properties are degraded. Accordingly, the amount of W is defined as 0.2 mass % or lower. The preferable amount of W is 0.005-0.06 mass %.

B: 0-30 ppm

When present in a solid solution state in austenite, B is concentrated in grain boundaries so as to suppress the generation of non-pearlite structure, such as ferrite, pseudo pearlite, bainite, or the like. If the amount of B is 4 ppm or higher, it is possible to obtain this effect. On the other hand, if B is excessively added, precipitation of coarse $Fe_{23}(CB)_6$ carbides in austenite is accelerated, and wire drawing properties are adversely affected. In order to satisfy the above, the upper limit of the amount of B is defined as 30 ppm. The amount of B is preferably 4-15 ppm, and more preferably 8-12 ppm.

REM: 0-50 ppm

REM (Rare Earth Metal) is effective for detoxifying of S, but an excessive addition generates oxides which becomes a cause of wire breakage, and therefore the upper limit of the REM content is defined as 50 ppm.

Ca: 0-50 ppm

Ca is effective to reduce hard alumina-based inclusions, but an excessive addition generates oxides which becomes a cause of wire breakage, and therefore the upper limit of the Ca content is defined as 50 ppm.

Mg: 0-50 ppm

Mg forms fine oxides so as to refine the structure of a steel and improve the ductility. If the content of Mg exceeds 50 ppm, breakage of the wire becomes apt to occur due to oxides, and therefore the upper limit of the Mg content is defined as 50 ppm.

Zr: 0-100 ppm

Since Zr forms the crystallization nuclei of austenite as ZrO, Zr increases the equiaxial crystal ratio of austenite and thus has an effect of reducing central segregation, but if the Zr content exceeds 100 ppm, breakage of the wire becomes apt to occur due to oxides, and therefore the upper limit of the Zr content is defined as 100 ppm.

Second Embodiment

Configuration of Steel Wires

The second embodiment of the invention is a steel wire which is obtained by drawing the wire rod described in the first embodiment and has a diameter of from 0.1-0.4 mm and a tensile strength of 4200 MPa or higher. The steel wire has 0.5% or less of the area in the surface layer area (the second surface layer area) in cross-section perpendicular to the longitudinal direction of the steel wire occupied by pro-eutectoid cementite.

Here, the second surface layer area refers to an area to a depth of 10 μm from the surface layer of the steel wire.

(Manufacturing Conditions of the Steel Wires)

The above steel wires can be obtained by drawing the wire rods described in the first embodiment, heating the rods to 900° C. or higher, performing patenting at least once, which starts cooling by introducing the heated wire rods to a lead bath or a fluidized bed at a temperature of 500° C.-600° C., and performing cold drawing.

Third Embodiment

Configuration of Steel Wires

The third embodiment of the invention is a steel wire which is obtained by drawing the wire rod described in the first embodiment with a diameter of from 5-16 mm and has a diameter of from 0.8-8 mm and a tensile strength of 1800 MPa or higher. The steel wire has 0.5% or less of the area in the surface layer area (the third surface layer area) in cross-section perpendicular to the longitudinal direction of the steel wire occupied by pro-eutectoid cementite.

Here, the third surface layer area refers to an area to a depth of 20 μm from the surface layer of the steel wire.

(Manufacturing Conditions of the Steel Wires)

The above steel wires can be obtained by performing cold drawing on the wire rods described in the first embodiment.

The steel wires obtained in the above manner may be used as they are after wire drawing, but treatments, such as (1) performing bluing, heat stretching, molten zinc plating, or molten zinc alloy plating after the wire drawing, (2) performing wire drawing after molten zinc plating or molten zinc alloy plating, or (3) performing another wire drawing after wire drawing and molten zinc plating or molten zinc alloy plating, or the like.

A wire rod, a steel wire, or a manufacturing method thereof having characteristics described in the above embodiments can be also expressed as follows:

That is, one aspect of the invention is a wire rod for high strength steel wire, including, by mass %, C: 0.95-1.30%; Si: 0.1-1.5%; Mn: 0.1-1.0%; Al: 0.1% or less; Ti: 0.1% or less; N: 10-50 ppm; and O: 10-40 ppm with the balance including Fe and inevitable impurities, the steel wire being composed of 97% or more of a pearlite by the area ratio with the remainder of bainite, pseudo pearlite, ferrite, grain boundary ferrite, and pro-eutectoid cementite, wherein the area ratio of pro-eutectoid cementite in an area with a radius of 100 μm from the central portion of the wire rod is 0.5% or less, the area ratio of pro-eutectoid cementite in an area to 50 μm depth of the wire rod from the surface layer is 0.5% or less.

In addition, the wire rod may further include, by % by mass, at least one kind or more selected from the group consisting of Cr: 0.5% or less (not including 0%), Ni: 0.5% or less (not including 0%), Co: 0.5% or less (not including 0%), V: 0.5% or less (not including 0%), Cu: 0.5% or less (not including 0%), Nb: 0.1% or less (not including 0%), Mo: 0.2% or less (not including 0%), W: 0.2% or less (not including 0%), B: 30 ppm or less (not including 0%).

In addition, another aspect of the invention is a high strength steel wire excellent in terms of ducility, obtained by drawing the above mentioned wire rod with a diameter of 3-7 mm, performing a patenting treatment, and again drawing the rod, in which the tensile strength is 4200 MPa or higher, and the area ratio of pro-eutectoid cementite in an area to 10 μm depth from the surface layer is 0.5% or less.

In addition, another aspect of the invention is a high strength steel wire excellent in terms of ducility obtained by drawing the above-mentioned wire rod with a diameter of 5.0-16 mm and then performing bluing, heat stretching, molten zinc plating, or molten zinc alloy plating; a steel wire obtained by performing molten zinc plating or molten zinc alloy plating on the above mentioned wire rod with a diameter of 5.0-16 mm as above, and then performing wire drawing; or a steel wire obtained by drawing the above mentioned wire rod with a diameter of 5.0-16 mm, performing molten zinc plating or molten zinc alloy plating, and then again performing wire drawing, in which the tensile strength is 1800 MPa or higher, and the area ratio of pro-eutectoid cementite in an area to 20 μm depth from the surface layer is 0.5% or less.

In addition, another aspect of the invention is a manufacturing method of a wire rod for high strength steel wires excellent in terms of ducility, in which when a billet with the above composition is hot-rolled so as to have a wire diameter of 3-16 mm, final rolling and coiling are performed, and then, when immersing into a molten salt, the temperature of the wire rod is set to 900° C. or higher, and, subsequently, a patenting treatment is performed by directly immersing into molten salt at a temperature of 500° C.-600° C.

In addition, another aspect of the invention is a manufacturing method of a wire rod for high strength steel wires excellent in terms of ductility, in which, when a billet with the above composition is hot-rolled so as to have a wire diameter of 3-16 mm, final rolling and coiling is performed, and then, when starting cooling of a Stelmor or the like for patenting, the temperature of the wire rod is set to 900° C. or higher, and, in the subsequent patenting treatment, quenching is performed in a manner in which the cooling rate Y while cooling from 900° C. to 650° C. satisfies Formula 1

$Y \geq \exp((C\% - 0.66)/0.12)$ (Formula 1)

and then pearlite transformation is finished at a temperature of from 500° C.-650° C.

In addition, another aspect of the invention is a manufacturing method of a high strength steel wire excellent in terms of ductility, in which, when performing reheating patenting on a wire rod having the above-described composition and a wire diameter of 3-16 mm, the heating temperature of the wire rod is set to 950° C.-1050° C., the temperature of the wire rod when starting cooling for the patenting is set to 900° C. or higher, and a patenting treatment is immediately performed in lead or a fluidizied bed of 500° C.-600° C.

In addition, another aspect of the invention is a manufacturing method of a high strength steel wire excellent in terms of ductility, in which a wire rod with a diameter of 3-7 mm manufactured by the above manufacturing method is drawn, cold wire drawing is furthermore performed after patenting, the heating temperature of the steel wire during the patenting is set to 950° C.-1050° C., the temperature of the steel wire when starting cooling for patenting is set to 900° C. or higher, that is a steel wire, on which a patenting treatment has been performed in a lead bath or a fluidized bed at a temperature of 500° C.-600° C., is drawn.

Example

Next, the invention will be described in more detail with examples, but the invention is not limited only to the following examples and can be appropriately modified and carried out within a scope not departing from the gist of the invention, and all of such modifications are included in the technical scope of the invention.

First Example

Tables 1 to 4 show the chemical components of A-1 steel, B-1 steel, C-1 steel, D-1 steel, E steel, F steel, G-1 steel, H steel, I steel, J steel, K steel, L-1 steel, M steel, N steel, 0 steel, P steel, Q-1 steel, Q-2 steel, and Q-3 steel, all of which are used in Examples α1 to α19 of the invention, and the chemical components of A-2 steel, A-3 steel, B-2 steel, B-3 steel, B-4 steel, C-2 steel, D-2 steel, G-2 steel, G-3 steel, G-4 steel, L-2 steel, R steel, S steel, T steel, U steel, V steel, W steel, and X steel, all of which are used in Comparative Examples α1 to α18. Further, in Tables 1 to 8, numeric values, disadvantageous results, and the like, not included in an appropriate scope are underlined.

Billets of steels containing the chemical components shown in Tables 1 to 4 were heated and then hot-rolled so as to become wire rods with a diameter of 3-7 mm, and then were subjected to final rolling at a predetermined temperature, coiling, and a patenting treatment.

After being coiled into a ring shape, the rolled wires were subjected to a patenting treatment by a Stelmor or a molten salt immersion patenting (DLP). Here, DLP refers to a direct in-line patenting facility with which rolled wire rods were directly immersed in molten salt so as to be patenting-treated. In the case of the Stelmor, the cooling rate Y from 900° C. to 650° C. was obtained from (900-650)/t[° C./s] by measuring the temperatures of overlapped ring portions on the Stelmor conveyor every 0.5 m with a non-contact type thermometer and measuring a necessary time t [s] for cooling from 900° C. to 650° C.

In order to measure the area ratios of pearlite and the area ratios of pro-eutectoid cementite in the rolled wire rods, one ring-shaped wire rod ring with a diameter of 1.0 m to 1.5 m was equally divided into 8 pieces, and two portions with the highest and lowest TSs were identified. 10 mm-long samples were taken out from the portions with the highest and lowest TSs in the continuous ring and implanted in a resin to make it possible to observe the cross-sections (C cross-section) perpendicular to the longitudinal direction. Then, the samples were alumina-polished and corroded with saturated picral, and then were subjected to SEM observation.

The area ratio of the pearlite was obtained from the average value of area ratios measured at four places in a 200 μm×200 μm square area, which is in ¼ depth from the surface at the above two portions (the portions with the highest and lowest TSs), every 90 degrees in the circumferential direction at a magnification of 3000 times by image analysis with an assumption that an area ratio excluding pseudo-pearlite portions in which cementite was granularly dispersed, bainite portions in which plate-shaped cementite was dispersed at a lamella spacing three or more times coarser than the surroundings, intergranular ferrite portions precipitated along austenite, and pro-eutectoid cementite portions was considered as the area ratio of pearlite.

Places where the SEM photos were taken for measurement of the area ratio of pro-eutectoid cementite will be described.

As the central area of a wire rod, an area with a radius of 100 μM from the central point in cross-section of the portion with the lowest TS was selected.

As the surface layer area of a wire rod, 4 places in a 50 μm×50 μm area in the vicinity of the circumferential portion in cross-section of the portion with the highest TS were selected every 90 degrees in the circumferential direction.

The selected areas were measured at a magnification of 5000 times, and the area ratio of pro-eutectoid cementite with a thickness of 100 nm or larger was measured by image analysis.

Further, with regard to the surface layer area, the maximum value of the measurement results of the four places was used.

For the wire drawing properties of a wire rod, a high strength wire rod was obtained in a manner in which, after scales were removed by pickling from a rolled wire rod, a 10 m-long wire rod provided with a zinc phosphate layer by a bonding treatment was prepared, and then subjected to single head-type wire drawing with an area reduction ratio per pass of 16% to 20% with intermediate lead patenting or fluidized bed patenting performed and then subjected to wet continuous wire drawing so as to have a diameter of 0.18 mm to 0.22 mm.

In order to measure the area ratio of pro-eutectoid cementite in the drawn steel wire, a 10 mm-long sample was taken out from the steel wire with a diameter of 0.18 m to 0.22 m and then implanted in a resin to make it possible to observe the cross-section (C cross-section) thereof perpendicular to the longitudinal direction. Then, the sample was alumina-polished and corroded with saturated picral, and then subjected to SEM observation.

As a place selected for the SEM observation, a 10 μm×50 μm rectangular area in the vicinity of the circumferential portion in cross-section of the steel wire was selected.

The selected place was measured at a magnification of 10000 times, and the area ratio of pro-eutectoid cementite with a thickness of 100 nm or larger was measured by image analysis.

Tables 5 to 8 show the manufacturing conditions and the measurement results of the wire rods and the steel wires in Examples α1 to α19 and Comparative Examples α1 to α18. In the tables, the FBP refers to a patenting treatment by a fluidized bed.

As is clear from Examples α1 to α19 shown in Tables 1 to 8, when the amounts of elements included in the wire rods were appropriately controlled so that the fractions of pro-eutectoid cementite in the surface layers and central portions of the rolled wire rods were suppressed, it was possible to suppress the occurrence of delamination and wire breakage during the wire drawing in the steel wires after the wire drawing.

In Comparative Examples α1, α5, α6, α7, α17, and α18, it was not possible to suppress the generation of surface layer pro-eutectoid cementite in the rolled wire rods due to the low temperature of the wire rods when starting the cooling, which is designed for the patenting. As a result, the area ratios of the pro-eutectoid cementite at the surface layer of the rolled wire rods exceeded 0.5%, and therefore delamination occurred in the steel wires after the final wire drawing.

Figure 2:
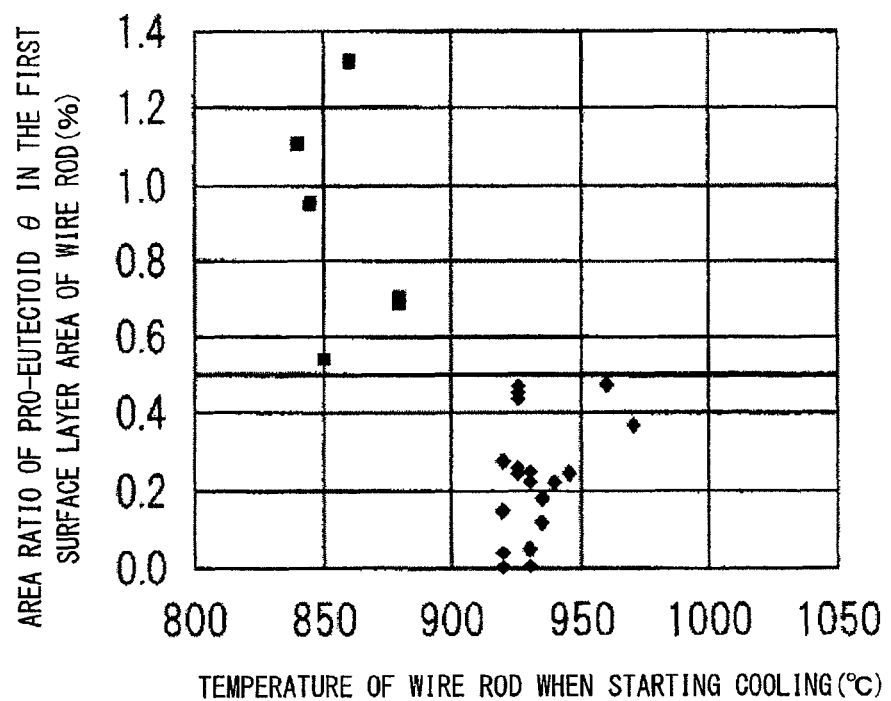
FIG. 2 shows the relationship between the temperatures where cooling of wire rods is started and the area ratios of pro-eutectoid θ in the first surface layer areas of the wire rods.

Here, as data reflecting the results of Examples α1 to α19 and the results of Comparative Examples α1, α5, α6, α7, α17, and α18, for which the temperatures of the wire rods when starting the cooling were set to less than 900° C., FIG. 2 shows the relationship between the temperatures of the rolled wire rods when starting the cooling and the area ratios of surface layer cementite. From the drawing, it can be confirmed that, when the temperatures of the wire rods when starting the cooling were set to 900° C. or higher, it was possible to suppress pro-eutectoid cementite at the surface layer of the wire rods to 0.5% or lower.

In Comparative Example α2, since the coiling temperature was high, the ductility of the rolled wire rod was low, and thus the rolled wire rod broke in the primary wire drawing.

In Comparative Example α3, since the heating temperature was low during the final patenting, it was not possible to suppress cementite at the surface layer and central area of the steel wire after the final wire drawing, and thus delamination occurred.

In Comparative Examples α4, α11, and α15, since the patenting treatments of the rolled wire rods were performed in a Stelmor, and the cooling rate Y from 900° C. to 650° C. did not satisfy Formula 1, a large amount of pro-eutectoid cementite was generated in the central areas of the wire rods, and the wire rods broke in the primary wire drawing.

$$Y \geq \exp((C\% - 0.66)/0.12) \quad \text{(Formula 1)}$$

Figure 3:
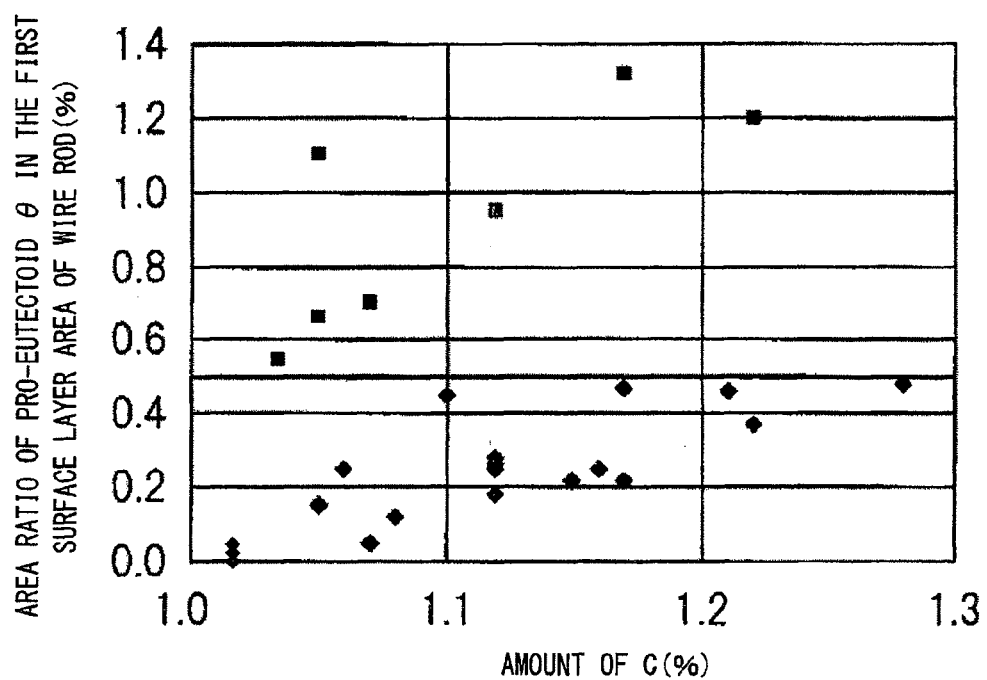
FIG. 3 shows the relationship between the amounts of C in wire rods and the area ratios of pro-eutectoid θ in the first surface layer areas of the wire rods.

FIG. 3 shows the relationship between the amounts of C in the wire rods and the area ratios of pre-eutectoid cementite in the surface layer area of the wire rods in Examples α1 to α19 and Comparative Examples α1, α5, α6, α7, α9, α17, and α18, for which the component ranges were appropriate, but the final temperature or the temperature when starting the cooling for the patenting, which is an important index that suppresses pro-eutectoid cementite in the surface layers, was low.

Figure 4:
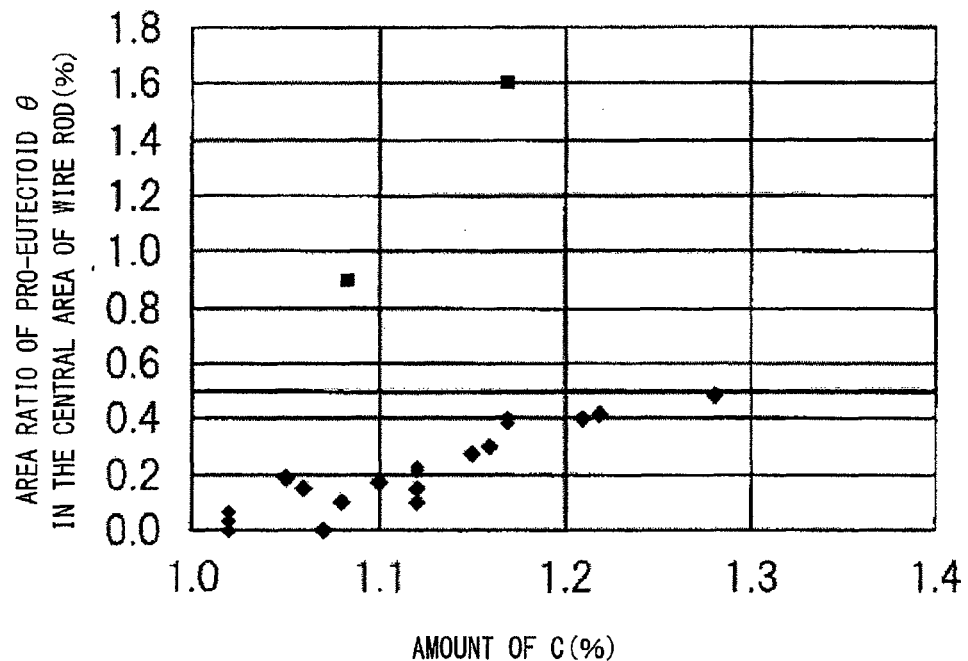
FIG. 4 shows the relationship between the amounts of C in wire rods and the area ratios of pro-eutectoid θ in the central areas of the wire rods.

FIG. 4 shows the relationship between the amounts of C in the wire rods and the area ratios of pre-eutectoid cementite in the central area of the wire rods in Examples α1 to α19 and Comparative Examples α4 and α11, for which the component ranges were appropriate, but the cooling rate Y from 900° C. to 650° C. did not satisfy (Formula 1).

Figure 5:
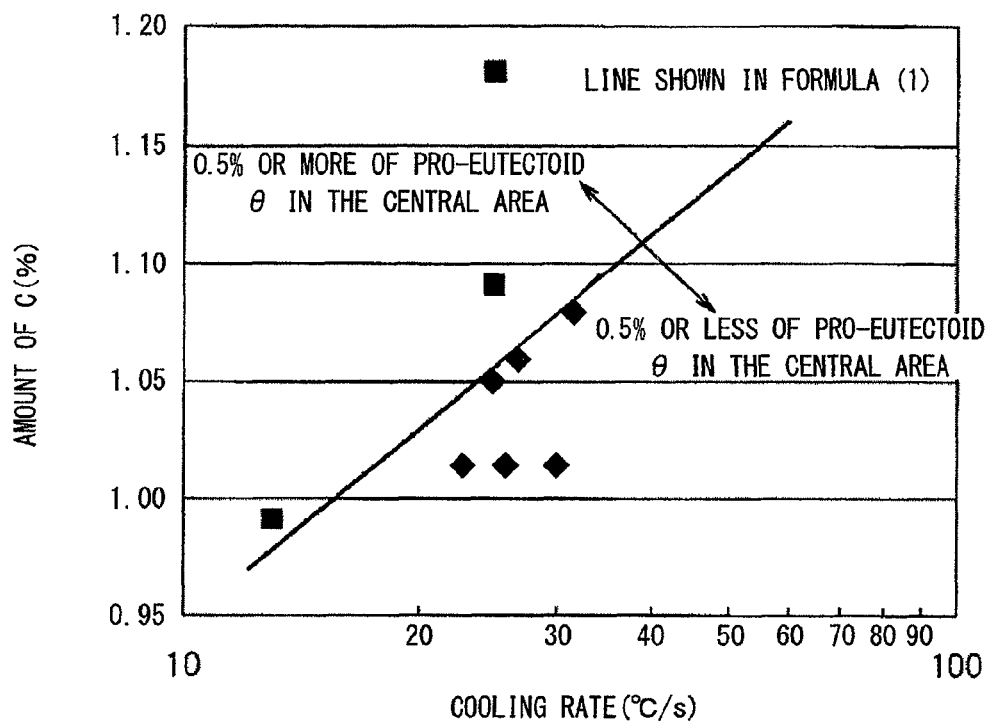
FIG. 5 shows the influence of the cooling rates from 900° C. to 650° C. and the amounts of C on the amounts of pro-eutectoid θ precipitated in the central areas of the wire rods.

FIG. 5 shows the influence of the cooling rate Y from 900° C. to 650° C. and the amounts of C on the amounts of pro-eutectoid cementite precipitated in the central areas of the wire rods in Examples α4, α8, α12, α17, α18, and α19 and Comparative Examples α4, α11, and α15, in which the wire rods were cooled in a Stelmor during the rolling of wire rods. From FIG. 5, it can be confirmed that, when the cooling rate Y satisfied (Formula 1), it was possible to suppress pro-eutectoid cementite in the central area of the wire rods to 0.5% or lower.

In Comparative Example α8, since the temperature of the molten salt was low, the ductility was lowered due to generation of upper bainite, and thus the wire rod broke in the primary wire drawing.

In Comparative Example α9, since the temperature of the final rolling was too low, pro-eutectoid cementite was generated in the surface layer of the wire rod during the final rolling. As a result, the area ratio of pro-eutetoid θ in the surface layer of the rolled wire rods exceeded 0.5%, and thus delamination occurred in the steel wire after the final wire drawing.

In Comparative Example α10, since the temperature of the final rolling was too high, the ductility of the wire rod was lowered, and thus the wire rod broke in the primary wire drawing.

In Comparative Example α12, since the amount of C was large, the strength of the wire rod was high, and the ductility was too low so that the wire rod broke in the primary wire drawing.

In Comparative Example α13, since the amount of C was low, it was not possible to obtain a steel wire with a predetermined TS.

In Comparative Example α14, since the amount of Mn was large, bainite or micro martensite was generated so that it was not possible to satisfy a predetermined pearlite fraction. As a result, the wire rod broke in the primary wire drawing.

In Comparative Example α16, since the amount of Si was large, bainite or micro martensite was generated so that it was not possible to satisfy a predetermined pearlite fraction. As a result, the wire rod broke in the primary wire drawing.

In Comparative Example α17, since the coiling temperature was a general condition, a large amount of surface layer pro-eutectoid θ was present, and thus delamination occurred in the steel wire after the final wire drawing.

In Comparative Example α18, since the coiling temperature was low, a large amount of surface layer pro-eutectoid θ was present, and thus delamination occurred in the steel wire after the final wire drawing.

TABLE 1

|  | Steel Type | Elements |  |  |  |  |  |  |  |  |
|---|---|---|---|---|---|---|---|---|---|---|
|  |  | C mass % | Si mass % | Mn mass % | P mass % | S mass % | Al mass % | Ti mass % | N ppm | O ppm |
| Example α1 | A-1 | 1.07 | 0.18 | 0.3 | 0.016 | 0.025 | 0.000 | 0.000 | 20 | 21 |
| Example α2 | B-1 | 1.17 | 0.20 | 0.32 | 0.008 | 0.007 | 0.003 | 0.000 | 26 | 23 |
| Example α3 | C-1 | 1.12 | 0.20 | 0.48 | 0.015 | 0.020 | 0.001 | 0.000 | 25 | 23 |
| Example α4 | D-1 | 1.06 | 0.34 | 0.3 | 0.008 | 0.008 | 0.000 | 0.000 | 26 | 26 |
| Example α5 | E | 1.15 | 0.20 | 0.3 | 0.010 | 0.008 | 0.004 | 0.000 | 25 | 38 |
| Example α6 | F | 1.21 | 0.20 | 0.5 | 0.008 | 0.008 | 0.000 | 0.001 | 25 | 21 |
| Example α7 | G-1 | 1.22 | 0.20 | 0.5 | 0.008 | 0.008 | 0.000 | 0.001 | 26 | 24 |
| Example α8 | H | 1.05 | 0.20 | 0.3 | 0.015 | 0.013 | 0.000 | 0.000 | 22 | 31 |
| Example α9 | I | 1.10 | 0.20 | 0.3 | 0.008 | 0.008 | 0.001 | 0.000 | 25 | 21 |
| Example α10 | J | 1.28 | 0.22 | 0.49 | 0.010 | 0.009 | 0.000 | 0.000 | 24 | 24 |
| Example α11 | K | 1.12 | 0.20 | 0.34 | 0.009 | 0.010 | 0.000 | 0.003 | 21 | 23 |
| Example α12 | L-1 | 1.08 | 0.20 | 0.4 | 0.010 | 0.007 | 0.000 | 0.000 | 20 | 28 |
| Example α13 | M | 1.12 | 0.20 | 0.3 | 0.019 | 0.015 | 0.000 | 0.000 | 27 | 25 |
| Example α14 | N | 1.17 | 0.30 | 0.3 | 0.008 | 0.008 | 0.000 | 0.000 | 27 | 21 |
| Example α15 | O | 1.16 | 0.58 | 0.3 | 0.008 | 0.010 | 0.000 | 0.000 | 27 | 22 |
| Example α16 | P | 1.12 | 0.70 | 0.51 | 0.008 | 0.008 | 0.001 | 0.004 | 27 | 35 |
| Example α17 | Q-1 | 1.02 | 0.20 | 0.3 | 0.008 | 0.008 | 0.001 | 0.002 | 27 | 25 |
| Example α18 | Q-2 | 1.02 | 0.20 | 0.3 | 0.008 | 0.008 | 0.001 | 0.002 | 27 | 25 |
| Example α19 | Q-3 | 1.02 | 0.20 | 0.3 | 0.008 | 0.008 | 0.001 | 0.002 | 27 | 25 |

TABLE 2

|  | Steel Type | Elements |  |  |  |  |  |  |  |  |  |  |  |  |
|---|---|---|---|---|---|---|---|---|---|---|---|---|---|---|
|  |  | Cr mass % | Ni mass % | Cu mass % | V mass % | Co mass % | Nb mass % | Mo mass % | W mass % | B ppm | REM ppm | Ca ppm | Mg ppm | Zr ppm |
| Example α1 | A-1 | 0.20 | 0.00 | 0.00 | 0.00 | 0.00 | 0.00 | 0.000 | 0.000 | 0 | 0 | 0 | 0 | 0 |
| Example α2 | B-1 | 0.22 | 0.00 | 0.00 | 0.00 | 0.00 | 0.00 | 0.000 | 0.000 | 0 | 0 | 0 | 0 | 0 |
| Example α3 | C-1 | 0.20 | 0.00 | 0.00 | 0.04 | 0.00 | 0.00 | 0.000 | 0.000 | 9 | 0 | 0 | 0 | 0 |
| Example α4 | D-1 | 0.18 | 0.00 | 0.00 | 0.00 | 0.00 | 0.00 | 0.030 | 0.000 | 8 | 0 | 0 | 0 | 0 |
| Example α5 | E | 0.05 | 0.00 | 0.00 | 0.00 | 0.10 | 0.00 | 0.030 | 0.000 | 0 | 0 | 0 | 0 | 0 |
| Example α6 | F | 0.00 | 0.00 | 0.00 | 0.06 | 0.00 | 0.00 | 0.000 | 0.000 | 0 | 0 | 0 | 0 | 0 |
| Example α7 | G-1 | 0.20 | 0.00 | 0.20 | 0.00 | 0.00 | 0.02 | 0.000 | 0.000 | 0 | 0 | 0 | 0 | 0 |
| Example α8 | H | 0.20 | 0.00 | 0.00 | 0.00 | 0.00 | 0.00 | 0.000 | 0.000 | 8 | 0 | 0 | 0 | 0 |
| Example α9 | I | 0.21 | 0.00 | 0.00 | 0.00 | 0.00 | 0.00 | 0.060 | 0.000 | 10 | 0 | 0 | 0 | 0 |
| Example α10 | J | 0.00 | 0.00 | 0.10 | 0.00 | 0.00 | 0.00 | 0.000 | 0.000 | 0 | 0 | 0 | 0 | 0 |
| Example α11 | K | 0.19 | 0.00 | 0.00 | 0.00 | 0.00 | 0.00 | 0.000 | 0.000 | 0 | 0 | 0 | 0 | 0 |
| Example α12 | L-1 | 0.00 | 0.10 | 0.00 | 0.00 | 0.00 | 0.00 | 0.000 | 0.000 | 0 | 0 | 0 | 0 | 0 |
| Example α13 | M | 0.18 | 0.00 | 0.00 | 0.00 | 0.00 | 0.00 | 0.000 | 0.000 | 8 | 0 | 0 | 0 | 0 |
| Example α14 | N | 0.23 | 0.00 | 0.00 | 0.00 | 0.00 | 0.00 | 0.000 | 0.000 | 9 | 0 | 0 | 0 | 0 |
| Example α15 | O | 0.20 | 0.00 | 0.00 | 0.00 | 0.00 | 0.00 | 0.000 | 0.050 | 0 | 0 | 0 | 0 | 0 |
| Example α16 | P | 0.00 | 0.00 | 0.00 | 0.00 | 0.00 | 0.00 | 0.000 | 0.000 | 0 | 0 | 0 | 0 | 0 |
| Example α17 | Q-1 | 0.20 | 0.00 | 0.00 | 0.00 | 0.00 | 0.00 | 0.000 | 0.000 | 0 | 0 | 0 | 0 | 0 |
| Example α18 | Q-2 | 0.20 | 0.00 | 0.00 | 0.00 | 0.00 | 0.00 | 0.000 | 0.000 | 0 | 0 | 0 | 0 | 0 |
| Example α19 | Q-3 | 0.20 | 0.00 | 0.00 | 0.00 | 0.00 | 0.00 | 0.000 | 0.000 | 0 | 0 | 0 | 0 | 0 |

TABLE 3

|  | Steel Type | Elements |  |  |  |  |  |  |  |  |
|---|---|---|---|---|---|---|---|---|---|---|
|  |  | C mass % | Si mass % | Mn mass % | P mass % | S mass % | Al mass % | Ti mass % | N ppm | O ppm |
| Comparative Example α1 | A-2 | 1.07 | 0.18 | 0.3 | 0.016 | 0.015 | 0.000 | 0.000 | 20 | 21 |
| Comparative Example α2 | A-3 | 1.07 | 0.18 | 0.3 | 0.016 | 0.015 | 0.000 | 0.000 | 20 | 21 |
| Comparative Example α3 | B-2 | 1.17 | 0.20 | 0.32 | 0.008 | 0.007 | 0.003 | 0.000 | 26 | 23 |
| Comparative Example α4 | B-3 | 1.17 | 0.20 | 0.32 | 0.008 | 0.007 | 0.003 | 0.000 | 26 | 23 |
| Comparative Example α5 | B-4 | 1.17 | 0.20 | 0.32 | 0.008 | 0.007 | 0.003 | 0.000 | 26 | 23 |
| Comparative Example α6 | C-2 | 1.12 | 0.20 | 0.48 | 0.015 | 0.020 | 0.001 | 0.000 | 25 | 23 |
| Comparative Example α7 | D-2 | 1.06 | 0.34 | 0.3 | 0.008 | 0.008 | 0.000 | 0.000 | 26 | 26 |

TABLE 3-continued

|  | Steel Type | C mass % | Si mass % | Mn mass % | P mass % | S mass % | Al mass % | Ti mass % | N ppm | O ppm |
|---|---|---|---|---|---|---|---|---|---|---|
| Comparative Example α8 | G-2 | 1.22 | 0.20 | 0.5 | 0.008 | 0.008 | 0.000 | 0.001 | 26 | 24 |
| Comparative Example α9 | G-3 | 1.22 | 0.20 | 0.5 | 0.008 | 0.008 | 0.000 | 0.001 | 26 | 24 |
| Comparative Example α10 | G-4 | 1.22 | 0.20 | 0.5 | 0.008 | 0.008 | 0.000 | 0.001 | 26 | 24 |
| Comparative Example α11 | L-2 | 1.08 | 0.20 | 0.4 | 0.010 | 0.007 | 0.000 | 0.000 | 20 | 28 |
| Comparative Example α12 | R | 1.35 | 0.20 | 0.3 | 0.015 | 0.013 | 0.000 | 0.000 | 22 | 31 |
| Comparative Example α13 | S | 0.92 | 0.20 | 0.5 | 0.010 | 0.009 | 0.000 | 0.010 | 25 | 23 |
| Comparative Example α14 | T | 1.12 | 0.20 | 1.2 | 0.009 | 0.010 | 0.000 | 0.003 | 21 | 23 |
| Comparative Example α15 | U | 0.98 | 0.20 | 0.5 | 0.009 | 0.010 | 0.000 | 0.003 | 21 | 23 |
| Comparative Example α16 | V | 1.12 | 1.60 | 0.2 | 0.009 | 0.010 | 0.000 | 0.003 | 21 | 23 |
| Comparative Example α17 | W | 1.04 | 0.21 | 0.4 | 0.008 | 0.005 | 0.001 | 0.001 | 35 | 11 |
| Comparative Example α18 | X | 1.05 | 0.18 | 0.49 | 0.006 | 0.005 | 0.001 | 0.000 | 25 | 10 |

TABLE 4

|  | Steel Type | Cr mass % | Ni mass % | Cu mass % | V mass % | Co mass % | Nb mass % | Mo mass % | W mass % | B ppm | REM ppm | Ca ppm | Mg ppm | Zr ppm |
|---|---|---|---|---|---|---|---|---|---|---|---|---|---|---|
| Comparative Example α1 | A-2 | 0.20 | 0.00 | 0.00 | 0.00 | 0.00 | 0.00 | 0.000 | 0.000 | 0 | 0 | 0 | 0 | 0 |
| Comparative Example α2 | A-3 | 0.20 | 0.00 | 0.00 | 0.00 | 0.00 | 0.00 | 0.000 | 0.000 | 0 | 0 | 0 | 0 | 0 |
| Comparative Example α3 | B-2 | 0.22 | 0.00 | 0.00 | 0.00 | 0.00 | 0.00 | 0.000 | 0.000 | 0 | 0 | 0 | 0 | 0 |
| Comparative Example α4 | B-3 | 0.22 | 0.00 | 0.00 | 0.00 | 0.00 | 0.00 | 0.000 | 0.000 | 0 | 0 | 0 | 0 | 0 |
| Comparative Example α5 | B-4 | 0.22 | 0.00 | 0.00 | 0.00 | 0.00 | 0.00 | 0.000 | 0.000 | 0 | 0 | 0 | 0 | 0 |
| Comparative Example α6 | C-2 | 0.20 | 0.00 | 0.00 | 0.04 | 0.00 | 0.00 | 0.000 | 0.000 | 9 | 0 | 0 | 0 | 0 |
| Comparative Example α7 | D-2 | 0.18 | 0.00 | 0.00 | 0.00 | 0.00 | 0.00 | 0.030 | 0.000 | 8 | 0 | 0 | 0 | 0 |
| Comparative Example α8 | G-2 | 0.20 | 0.00 | 0.20 | 0.00 | 0.00 | 0.02 | 0.000 | 0.000 | 0 | 0 | 0 | 0 | 0 |
| Comparative Example α9 | G-3 | 0.20 | 0.00 | 0.20 | 0.00 | 0.00 | 0.02 | 0.000 | 0.000 | 0 | 0 | 0 | 0 | 0 |
| Comparative Example α10 | G-4 | 0.20 | 0.00 | 0.20 | 0.00 | 0.00 | 0.02 | 0.000 | 0.000 | 0 | 0 | 0 | 0 | 0 |
| Comparative Example α11 | L-2 | 0.00 | 0.10 | 0.00 | 0.00 | 0.00 | 0.00 | 0.000 | 0.000 | 0 | 0 | 0 | 0 | 0 |
| Comparative Example α12 | R | 0.20 | 0.00 | 0.00 | 0.00 | 0.00 | 0.00 | 0.000 | 0.000 | 8 | 0 | 0 | 0 | 0 |
| Comparative Example α13 | S | 0.21 | 0.00 | 0.00 | 0.10 | 0.00 | 0.00 | 0.000 | 0.000 | 0 | 0 | 0 | 0 | 0 |
| Comparative Example α14 | T | 0.19 | 0.00 | 0.00 | 0.00 | 0.00 | 0.00 | 0.000 | 0.000 | 0 | 0 | 0 | 0 | 0 |
| Comparative Example α15 | U | 0.19 | 0.00 | 0.00 | 0.00 | 0.00 | 0.00 | 0.000 | 0.000 | 0 | 0 | 0 | 0 | 0 |
| Comparative Example α16 | V | 0.19 | 0.00 | 0.00 | 0.00 | 0.00 | 0.00 | 0.000 | 0.000 | 0 | 0 | 0 | 0 | 0 |
| Comparative Example α17 | W | 0.49 | 0.00 | 0.00 | 0.00 | 0.00 | 0.00 | 0.000 | 0.000 | 0 | 0 | 0 | 0 | 0 |
| Comparative Example α18 | X | 0.22 | 0.01 | 0.11 | 0.00 | 0.00 | 0.00 | 0.000 | 0.000 | 10 | 0 | 0 | 0 | 0 |

TABLE 5

|  | Steel Type | Wire diameter mm | Final temperature °C. | Coiling temperature °C. | Temp. of wire rod when starting cooling °C. | Cooling method | Salt temperature °C. | (Formula 1) Right side |
|---|---|---|---|---|---|---|---|---|
| Example α1 | A-1 | 5.5 | 1010 | 970 | 930 | DLP | 550 | — |
| Example α2 | B-1 | 5.5 | 1020 | 985 | 940 | DLP | 545 | — |
| Example α3 | C-1 | 5.5 | 1025 | 960 | 920 | DLP | 555 | — |
| Example α4 | D-1 | 3.8 | 1005 | 960 | 925 | Stelmor | — | 28.0 |
| Example α5 | E | 5.5 | 1000 | 975 | 930 | DLP | 570 | — |
| Example α6 | F | 5.5 | 1020 | 970 | 925 | DLP | 580 | — |
| Example α7 | G-1 | 5.5 | 1030 | 1010 | 970 | DLP | 600 | — |
| Example α8 | H | 5.0 | 1010 | 955 | 920 | Stelmor | — | 25.8 |
| Example α9 | I | 5.5 | 1015 | 955 | 925 | DLP | 540 | — |
| Example α10 | J | 5.5 | 1020 | 990 | 960 | DLP | 600 | — |
| Example α11 | K | 5.5 | 1005 | 960 | 930 | DLP | 550 | — |
| Example α12 | L-1 | 5.5 | 1050 | 965 | 935 | Stelmor | — | 33.1 |
| Example α13 | M | 5.0 | 1010 | 960 | 925 | DLP | 575 | — |
| Example α14 | N | 5.5 | 1030 | 950 | 925 | DLP | 575 | — |
| Example α15 | O | 6.8 | 1020 | 980 | 945 | DLP | 540 | — |
| Example α16 | P | 5.5 | 1035 | 975 | 935 | DLP | 530 | — |
| Example α17 | Q-1 | 5.5 | 1010 | 950 | 920 | Stelmor | — | 20.09 |
| Example α18 | Q-2 | 5.5 | 1020 | 960 | 930 | Stelmor | — | 20.09 |
| Example α19 | Q-3 | 5.5 | 1005 | 955 | 920 | Stelmor | — | 20.09 |

TABLE 5-continued

|  | Cooling rate Y 900→650° ° C./s | Strength of rolled material MPa | Area ratio of pearlite % | Area ratio of pro-eutectoid θ in the surface layer area of wire rod % | Area ratio of pro-eutectoid θ in the central area of wire rod % |
|---|---|---|---|---|---|
| Example α1 | — | 1500 | 98.5 | 0.05 | 0.00 |
| Example α2 | — | 1600 | 99.0 | 0.22 | 0.40 |
| Example α3 | — | 1570 | 97.2 | 0.28 | 0.22 |
| Example α4 | 29.0 | 1410 | 98.6 | 0.25 | 0.15 |
| Example α5 | — | 1560 | 99.2 | 0.22 | 0.28 |
| Example α6 | — | 1630 | 99.1 | 0.46 | 0.40 |
| Example α7 | — | 1610 | 97.5 | 0.37 | 0.42 |
| Example α8 | 27.0 | 1400 | 98.2 | 0.15 | 0.19 |
| Example α9 | — | 1540 | 98.4 | 0.45 | 0.17 |
| Example α10 | — | 1690 | 97.9 | 0.48 | 0.49 |
| Example α11 | — | 1560 | 99.1 | 0.25 | 0.10 |
| Example α12 | 34.0 | 1550 | 99.5 | 0.12 | 0.10 |
| Example α13 | — | 1530 | 97.1 | 0.26 | 0.22 |
| Example α14 | — | 1580 | 98.2 | 0.47 | 0.39 |
| Example α15 | — | 1620 | 98.3 | 0.25 | 0.30 |
| Example α16 | — | 1660 | 99.0 | 0.18 | 0.15 |
| Example α17 | 23.0 | 1340 | 97.5 | 0.05 | 0.08 |
| Example α18 | 30.0 | 1355 | 98.5 | 0.00 | 0.00 |
| Example α19 | 25.0 | 1355 | 98.5 | 0.01 | 0.01 |

TABLE 6

|  | Steel Type | Diameter of final patented wire mm | Heating temp. of final patenting ° C. | Temp. of steel wire when starting cooling ° C. | Patenting method | Patenting temperature ° C. | Strength of patented material MPa | Diameter of final drawn wire mm |
|---|---|---|---|---|---|---|---|---|
| Example α1 | A-1 | 1.46 | 950 | 930 | LP | 575 | 1560 | 0.20 |
| Example α2 | B-1 | 1.27 | 980 | 960 | LP | 575 | 1670 | 0.20 |
| Example α3 | C-1 | 1.27 | 960 | 940 | LP | 580 | 1640 | 0.20 |
| Example α4 | D-1 | 1.46 | 950 | 925 | FBP | 575 | 1530 | 0.20 |
| Example α5 | E | 1.27 | 970 | 950 | LP | 550 | 1640 | 0.20 |
| Example α6 | F | 1.09 | 995 | 970 | LP | 590 | 1690 | 0.20 |
| Example α7 | G-1 | 1.18 | 1000 | 980 | FBP | 575 | 1720 | 0.20 |
| Example α8 | H | 1.46 | 950 | 935 | LP | 550 | 1560 | 0.20 |
| Example α9 | I | 1.27 | 955 | 930 | LP | 575 | 1600 | 0.18 |
| Example α10 | J | 1.27 | 1030 | 1000 | LP | 600 | 1720 | 0.20 |
| Example α11 | K | 1.27 | 960 | 930 | FBP | 575 | 1630 | 0.20 |
| Example α12 | L-1 | 1.46 | 950 | 935 | LP | 575 | 1590 | 0.22 |
| Example α13 | M | 1.27 | 960 | 940 | LP | 600 | 1630 | 0.20 |
| Example α14 | N | 1.27 | 980 | 945 | LP | 575 | 1690 | 0.20 |
| Example α15 | O | 1.27 | 975 | 955 | LP | 575 | 1710 | 0.20 |
| Example α16 | P | 1.27 | 975 | 955 | LP | 575 | 1720 | 0.22 |
| Example α17 | Q-1 | 1.53 | 960 | 930 | FBP | 550 | 1470 | 0.18 |
| Example α18 | Q-2 | 1.53 | 960 | 930 | FBP | 550 | 1475 | 0.18 |
| Example α19 | Q-3 | 1.53 | 960 | 930 | FBP | 550 | 1465 | 0.18 |

|  | TS of Final drawn wire MPa | Area ratio of pro-eutectoid θ in the surface layer area of steel wire % | Area ratio of pro-eutectoid θ in the central area of steel wire % | Wire breakage during wire drawing | Delamination |
|---|---|---|---|---|---|
| Example α1 | 4331 | 0.00 | 0.00 | Not occur | Not occur |
| Example α2 | 4350 | 0.14 | 0.21 | Not occur | Not occur |
| Example α3 | 4253 | 0.09 | 0.08 | Not occur | Not occur |
| Example α4 | 4244 | 0.08 | 0.00 | Not occur | Not occur |
| Example α5 | 4265 | 0.12 | 0.15 | Not occur | Not occur |
| Example α6 | 4052 | 0.12 | 0.21 | Not occur | Not occur |
| Example α7 | 4320 | 0.15 | 0.18 | Not occur | Not occur |
| Example α8 | 4323 | 0.02 | 0.04 | Not occur | Not occur |
| Example α9 | 4378 | 0.08 | 0.00 | Not occur | Not occur |
| Example α10 | 4521 | 0.25 | 0.24 | Not occur | Not occur |
| Example α11 | 4227 | 0.09 | 0.05 | Not occur | Not occur |
| Example α12 | 4207 | 0.05 | 0.03 | Not occur | Not occur |
| Example α13 | 4227 | 0.07 | 0.06 | Not occur | Not occur |
| Example α14 | 4402 | 0.13 | 0.14 | Not occur | Not occur |
| Example α15 | 4450 | 0.15 | 0.13 | Not occur | Not occur |
| Example α16 | 4231 | 0.10 | 0.06 | Not occur | Not occur |

TABLE 6-continued

|  |  |  |  |  |  |
|---|---|---|---|---|---|
| Example α17 | 4373 | 0.04 | 0.06 | Not occur | Not occur |
| Example α18 | 4405 | 0.00 | 0.00 | Not occur | Not occur |
| Example α19 | 4360 | 0.00 | 0.01 | Not occur | Not occur |

TABLE 7

|  | Steel Type | Wire diameter mm | Final temperature ° C. | Coiling temperature ° C. | Temp. of wire rod when starting cooling ° C. | Cooling method | Salt temperature ° C. | (Formula 1) Right side | Cooling rate Y 900→650° ° C./s | Strength of rolled material MPa | Area ratio of pearlite % | Area ratio of proeutectoid θ in the surface layer area of wire rod % | Area ratio of proeutectoid θ in the central area of wire rod % |
|---|---|---|---|---|---|---|---|---|---|---|---|---|---|
| Comparative Example α1 | A-2 | 5.5 | 1030 | 910 | 880 | DLP | 550 | — | — | 1490 | 98.2 | 0.70 | 0.00 |
| Comparative Example α2 | A-3 | 5.5 | 1080 | 1060 | 1030 | DLP | 550 | — | — | 1510 | 97.3 | 0.03 | 0.00 |
| Comparative Example α3 | B-2 | 5.5 | 1030 | 985 | 945 | DLP | 540 | — | — | 1610 | 99.3 | 0.22 | 0.42 |
| Comparative Example α4 | B-3 | 5.5 | 1035 | 985 | 940 | Stelmor | — | 70.1 | 25.0 | 1510 | 99.1 | 0.21 | 1.60 |
| Comparative Example α5 | B-4 | 5.5 | 1035 | 900 | 860 | DLP | 550 | — | — | 1610 | 97.5 | 1.32 | 0.41 |
| Comparative Example α6 | C-2 | 5.5 | 1025 | 880 | 845 | DLP | 550 | — | — | 1560 | 97.6 | 0.95 | 0.15 |
| Comparative Example α7 | D-2 | 3.8 | 1050 | 880 | 840 | Stelmor | — | 28.0 | 30.0 | 1400 | 98.2 | 1.10 | 0.25 |
| Comparative Example α8 | G-2 | 5.5 | 1020 | 980 | 945 | DLP | 480 | — | — | 1620 | 85.9 | 0.35 | 0.45 |
| Comparative Example α9 | G-3 | 5.5 | 960 | 940 | 930 | DLP | 560 | — | — | 1670 | 97.8 | 1.20 | 0.46 |
| Comparative Example α10 | G-4 | 5.5 | 1090 | 990 | 950 | DLP | 540 | — | — | 1650 | 98.6 | 0.42 | 0.42 |
| Comparative Example α11 | L-2 | 5.5 | 1050 | 965 | 935 | Stelmor | — | 33.1 | 25.0 | 1440 | 99.1 | 0.12 | 0.90 |
| Comparative Example α12 | R | 5.5 | 1020 | 980 | 940 | DLP | 560 | — | — | 1730 | 99.2 | 0.66 | 0.71 |
| Comparative Example α13 | S | 5.5 | 1030 | 950 | 925 | DLP | 550 | — | — | 1410 | 97.3 | 0.00 | 0.00 |
| Comparative Example α14 | T | 5.5 | 1030 | 960 | 930 | DLP | 550 | — | — | 1640 | 95.2 | 0.30 | 0.28 |
| Comparative Example α15 | U | 5.5 | 1030 | 960 | 920 | Stelmor | — | 14.4 | 13.0 | 1250 | 97.3 | 0.00 | 0.60 |
| Comparative Example α16 | V | 5.5 | 1030 | 960 | 930 | DLP | 540 | — | — | 1650 | 91.6 | 0.00 | 0.36 |
| Comparative Example α17 | W | 5.5 | 980 | 880 | 850 | Stelmor | — | 23.7 | 25.0 | 1300 | 98.0 | 0.55 | 0.15 |
| Comparative Example α18 | X | 5.5 | 1037 | 915 | 880 | Stelmor | — | 25.8 | 45.0 | 1320 | 97.5 | 0.67 | 0.01 |

TABLE 8

|  | Steel Type | Diameter of final patented wire mm | Heating temp. of final patenting ° C. | Temp. of steel wire when starting cooling ° C. | Patenting method | Patenting temperature ° C. | Strength of patented material MPa | Diameter of final drawn wire mm | TS of Final drawn wire MPa | Area ratio of proeutectoid θ in the surface layer area of steel wire % | Area ratio of proeutectoid θ in the central area of steel wire % | Wire breakage during wire drawing | Delamination |
|---|---|---|---|---|---|---|---|---|---|---|---|---|---|
| Comparative Example α1 | A-2 | 1.27 | 955 | 920 | LP | 575 | 1565 | 0.20 | 4040 | 0.00 | 0.00 | Not occur | Occur |

TABLE 8-continued

| | Steel Type | Diameter of final patented wire mm | Heating temp. of final patenting ° C. | Temp. of steel wire when starting cooling ° C. | Patenting method | Patenting temperature ° C. | Strength of patented material MPa | Diameter of final drawn wire mm | TS of Final drawn wire MPa | Area ratio of pro-eutectoid θ in the surface layer area of steel wire % | Area ratio of pro-eutectoid θ in the central area of steel wire % | Wire breakage during wire drawing | Delamination |
|---|---|---|---|---|---|---|---|---|---|---|---|---|---|
| Comparative Example α2 | A-3 | Wire breakage during primary wire drawing | — | — | — | — | — | — | — | — | — | — | — |
| Comparative Example α3 | B-2 | 1.27 | 920 | 880 | LP | 600 | 1650 | 0.20 | 4298 | 0.85 | 0.18 | Not occur | Occur |
| Comparative Example α4 | B-3 | Wire breakage during primary wire drawing | — | — | — | — | — | — | — | — | — | — | — |
| Comparative Example α5 | B-4 | 1.27 | 960 | 940 | LP | 575 | 1660 | 0.20 | 4324 | 0.21 | 0.31 | Not occur | Occur |
| Comparative Example α6 | C-2 | 1.27 | 960 | 945 | LP | 570 | 1650 | 0.20 | 4279 | 0.09 | 0.08 | Not occur | Occur |
| Comparative Example α7 | D-2 | 1.46 | 950 | 930 | FBP | 575 | 1535 | 0.20 | 4258 | 0.03 | 0.00 | Not occur | Occur |
| Comparative Example α8 | G-2 | Wire breakage during primary wire drawing | — | — | — | — | — | — | — | — | — | — | — |
| Comparative Example α9 | G-3 | 1.27 | 980 | 960 | LP | 575 | 1720 | 0.20 | 4499 | 0.48 | 0.46 | Not occur | Occur |
| Comparative Example α10 | G-4 | Wire breakage during primary wire drawing | — | — | — | — | — | — | — | — | — | — | — |
| Comparative Example α11 | L-2 | Wire breakage during primary wire drawing | — | — | — | — | — | — | — | — | — | — | — |
| Comparative Example α12 | R | Wire breakage during primary wire drawing | — | — | — | — | — | — | — | — | — | — | — |
| Comparative Example α13 | S | 1.46 | 950 | 930 | LP | 575 | 1430 | 0.20 | 3911 | 0.00 | 0.00 | Not occur | Not occur |
| Comparative Example α14 | T | Wire breakage during primary wire drawing | — | — | — | — | — | — | — | — | — | — | — |
| Comparative Example α15 | U | Wire breakage during primary wire drawing | — | — | — | — | — | — | — | — | — | — | — |

TABLE 8-continued

|  | Steel Type | Diameter of final patented wire mm | Heating temp. of final patenting °C. | Temp. of steel wire when starting cooling °C. | Patenting method | Patenting temperature °C. | Strength of patented material MPa | Diameter of final drawn wire mm | TS of Final drawn wire MPa | Area ratio of pro-eutectoid θ in the surface layer area of steel wire % | Area ratio of pro-eutectoid θ in the central area of steel wire % | Wire breakage during wire drawing | Delamination |
|---|---|---|---|---|---|---|---|---|---|---|---|---|---|
| Comparative Example α16 | V | Wire breakage during primary wire drawing | — | — | — | — | — | — | — | — | — | — | — |
| Comparative Example α17 | W | 1.50 | 960 | 945 | LP | 575 | 1410 | 0.20 | <u>3957</u> | 0.02 | 0.00 | Not occur | <u>Occur</u> |
| Comparative Example α18 | X | 1.46 | 970 | 955 | LP | 575 | 1420 | 0.20 | <u>3935</u> | 0.00 | 0.00 | Not occur | <u>Occur</u> |

Second Example

Tables 9 to 12 show the chemical components of a-1 steel, b-1 steel, c steel, d steel, e steel, f-2 steel, g-1 steel, h steel, i steel, j-1 steel, k steel, l steel, m steel, n steel, o steel, and p steel, all of which are used in Examples β1 to β16 of the invention, and the chemical components of j-2 steel, b-2 steel, f-2 steel, a-2 steel, g-2 steel, q steel, and r steel, all of which are used in Comparative Examples β1 to β7. Further, in Tables 9 to 16, numeric values, disadvantageous results, and the like, not included in an appropriate scope, are underlined.

Billets of steels containing the chemical components shown in Tables 9 to 12 were heated and then hot-rolled so as to become wire rods with a diameter of 5.0 mm to 16 mm, and then subjected to final rolling at a predetermined temperature, coiling, and a patenting treatment or reheating patenting.

After being coiled into a ring shape, the rolled wire rods were subjected to a patenting treatment by a Stelmor or a direct in-line patenting (DLP). In the case of the Stelmor, the cooling rate Y from 900° C. to 650° C. was obtained from (900-650)/t[° C./s] by measuring the temperatures of over-lapped ring portions on the Stelmor conveyor every 0.5 m with a non-contact type thermometer and measuring a necessary time t [t] for cooling from 900° C. to 650° C.

In order to measure the area ratios of pearlite and the area ratios of pro-eutectoid cementite in the rolled wire rods, one ring-shaped wire rod ring with a diameter of 1.0 m to 1.5 m was equally divided into 8 pieces, and the portions with the highest and lowest TSs were identified. 10 mm-long samples were taken out from two portions with the highest and lowest TSs in the continuous ring and implanted in a resin to make it possible to observe the cross-sections (C cross-sections) perpendicular to the longitudinal direction. Then, the samples were alumina-polished and corroded with saturated picral, and then were subjected to SEM observation.

The area ratio of the pearlite was obtained from the average value of area ratios measured at four places in a 200 μm×200 μm square area, which is in ¼ depth portion (D=diameter) from the surface layer at the above two portions (the portions with the highest and lowest TSs), every 90 degrees in a circumferential direction at a magnification of 3000 times by image analysis with an assumption that an area ratio excluding pseudo-pearlite portions in which cementite was granu-larly dispersed, bainite portions in which plate-shaped cementite was dispersed at a lamella spacing three or more times coarser than the surroundings, intergranular ferrite portions precipitated alongside, and pro-eutectoid cementite portions was considered as the area ratio of pearlite.

Places where the SEM photos were taken for measurement of the area ratio of pro-eutectoid cementite will be described.

As the central area of a wire rod, an area with a radius of 100 μm from the central point in cross-section of the portion with the lowest TS was selected.

As the surface layer area of a wire rod, 4 places in a 50 μm×50 μm square area in the vicinity of the circumferential portion in cross-section of the portion with the highest TS were selected every 90 degrees in the circumferential direction.

The selected areas were measured at a magnification of 5000 times, and the area ratio of pro-eutectoid cementite with a thickness of 100 nm or larger was measured by image analysis.

Further, with regard to the surface layer area, the maximum value of the measurement results of the four places was used.

For the wire drawing properties of a wire rod, a target high strength steel wire was obtained in any of the following methods and then evaluated by performing a tensile strength test and a twist test.

(1) After scales were removed by pickling from a rolled wire rod, a 20 m-long wire rod provided with a zinc phosphate layer by a bonding treatment was prepared, and then subjected to single head-type wire drawing with an area reduction ratio per pass of 16% to 20% so as to obtain a high strength steel wire with a diameter of 0.8 mm to 7 mm. The steel wire was subjected to any of molten zinc plating, molten zinc alloy plating, bluing, and heat stretching.

(2) After scales were removed by pickling from a rolled wire rod, a 20 m-long wire rod on which molten zinc plating or molten zinc alloy plating had been performed was prepared, and then subjected to single head-type wire drawing with an area reduction ratio per pass of 16% to 20% so as to obtain a high strength steel wire with a diameter of 0.8 mm to 7 mm.

(3) After scales were removed by pickling from a rolled wire rod, a 20 m-long wire rod provided with a zinc phosphate layer by a bonding treatment was prepared, then subjected to single head-type wire drawing with an area reduction ratio per pass of 16% to 20%, and then subjected to molten zinc plating or molten zinc alloy plating, and, furthermore, wire drawing so as to obtain a high strength steel wire with a diameter of 0.8 mm to 7 mm.

In order to measure the area ratio of pro-eutectoid cementite in the drawn wire rod, a 10 mm-long sample was taken out from the steel wire and then implanted in a resin to make it possible to observe the cross-section (C cross-section) perpendicular to the longitudinal direction. Then, the sample was alumina-polished and corroded with saturated picral, and then was subjected to SEM observation.

As a place selected for the SEM phototaking, a 20 μm×50 μm rectangular area in the vicinity of the circumferential portion in cross-section of the steel wire was selected.

The selected place was measured at a magnification of 10000 times, and the area ratio of pro-eutectoid cementite with a thickness of 100 nm or larger was measured by image analysis.

Tables 13 to 16 show the manufacturing conditions and the measurement results of the wire rods and the steel wires in Examples β1 to β16 and Comparative Examples β1 to β7.

As is clear from Examples β1 to β16 shown in Tables 9 to 16, when the amounts of elements included in the wire rods were appropriately controlled so that the fractions of pro-eutectoid cementite in the surface layers and central portions of the rolled wire rods were suppressed, it was possible to suppress the occurrence of delamination and wire breakage in the steel wires after the wire drawing.

In Comparative Examples β1 and β5, it was not possible to suppress the generation of surface layer pro-eutectoid cementite in the rolled wire rods due to the low temperature of the wire rods when starting the cooling, which is designed for the patenting.

Figure 6:
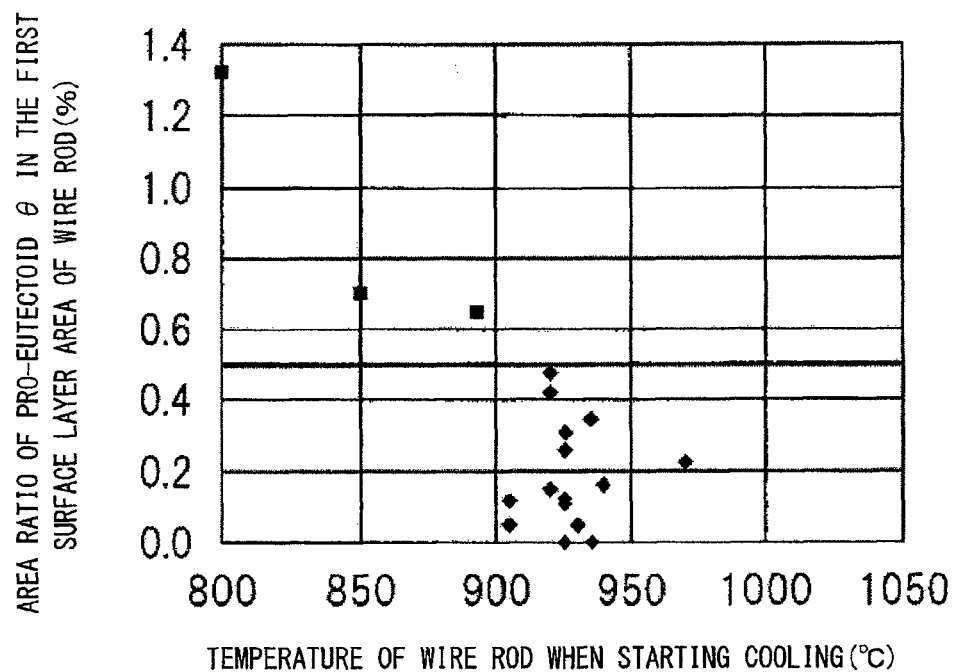
FIG. 6 shows the relationship between the temperatures where cooling of wire rods is started and the area ratios of pro-eutectoid θ in the first surface layer areas of the wire rods.

Here, as data reflecting the results of Examples β1 to β16 and the results of Comparative Examples β1, β5, and β7, for which the temperatures of the wire rods when starting the cooling were set to less than 900° C., FIG. 6 shows the relationship between the temperatures of the rolled wire rods when starting the cooling and the area ratios of surface layer cementite. From the drawing, it can be confirmed that, when the temperatures of the wire rods when starting the cooling were set to 900° C. or higher, it was possible to suppress pro-eutectoid cementite at the surface layer of the wire rods to 0.5% or lower.

In Comparative Example β2 and β7, since the final rolling temperature was too low, pro-eutectoid cementite was generated in the surface layer of the wire rod during the final rolling.

In Comparative Examples β3 and β4, since the patenting treatments of the rolled wire rods were performed in a Stelmor, and the cooling rate Y from 900° C. to 650° C. did not satisfy Formula 1, a predetermined cooling rate in accordance with the amount of C could not be obtained, and a large amount of pro-eutectoid cementite was generated in the central areas of the wire rods so that the wire rods were broken during the wire drawing.

$$Y \geq \exp((C\% - 0.66)/0.12) \quad \text{(Formula 1)}$$

In Comparative Example β6, since the q steel containing more than the regulated amount of B was used, a large amount of cementite was generated in the surface layer.

Figure 7:
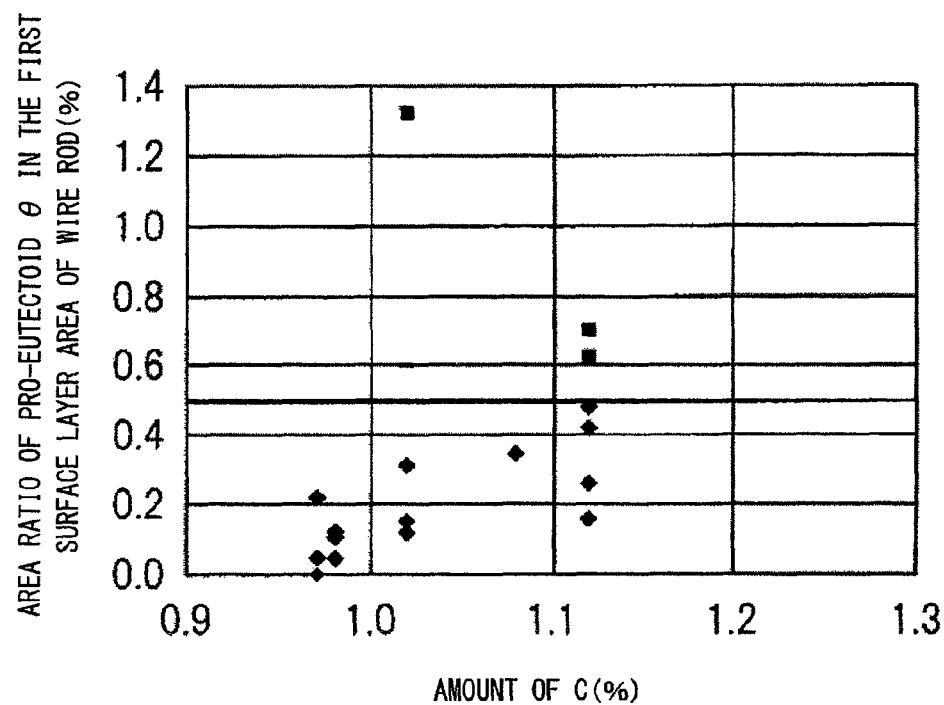
FIG. 7 shows the relationship between the amounts of C in wire rods and the area ratios of pro-eutectoid θ in the first surface layer areas of the wire rods.

FIG. 7 shows the relationship between the amounts of C in the wire rods and the area ratios of pre-eutectoid cementite in the surface layer area of the wire rods in Examples β1 to β16 and Comparative Examples β1, β2, and β5, for which the component ranges were appropriate, but the final temperature or the temperature when starting the cooling for the patenting, which is *an important index that suppresses pro-eutectoid cementite in the surface layers, was low.

Figure 8:
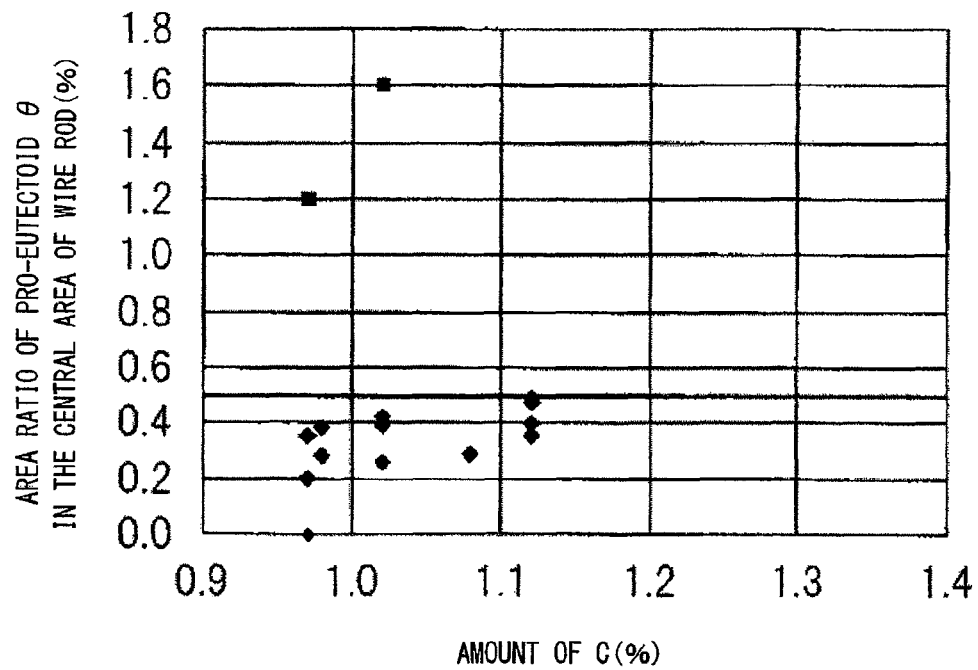
FIG. 8 shows the relationship between the amounts of C in wire rods and the area ratios of pro-eutectoid θ in the central areas of the wire rods.

FIG. 8 shows the relationship between the amounts of C in the wire rods and the area ratios of pre-eutectoid cementite in the central area of the wire rods in Examples β1 to β16 and Comparative Examples β3 and β4, for which the component ranges were appropriate, but the cooling rate Y from 900° C. to 650° C. did not satisfy (Formula 1).

Figure 9:
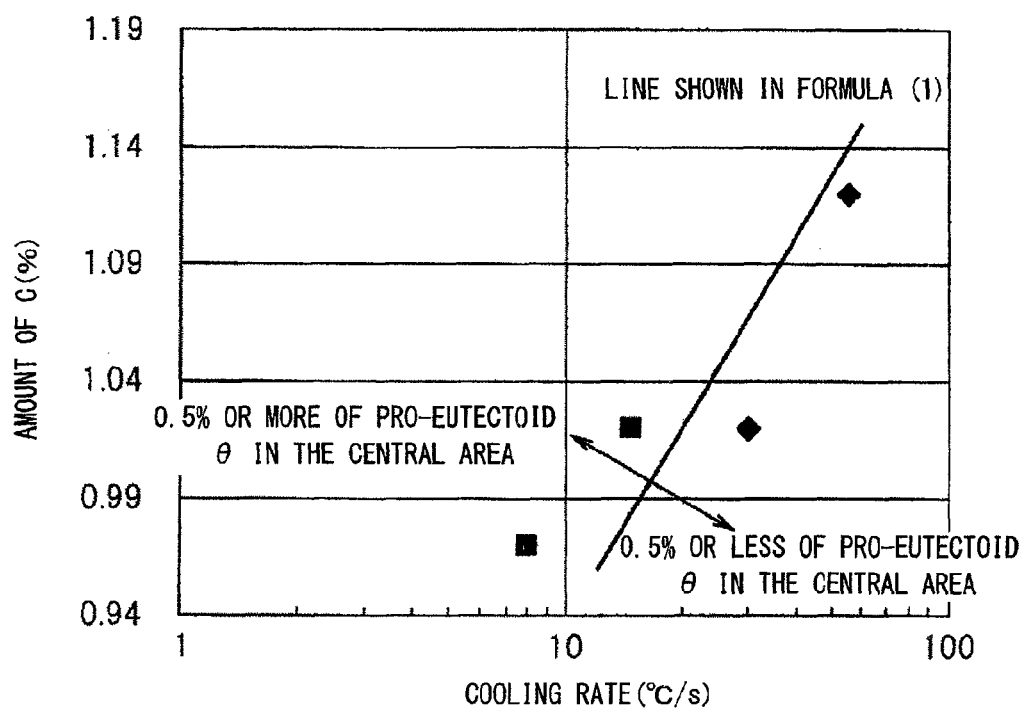
FIG. 9 shows the influence of the cooling rates from 900° C. to 650° C. and the amounts of C on the amounts of pro-eutectoid θ precipitated in the central areas of the wire rods.

FIG. 9 shows the influence of the cooling rate Y from 900° C. to 650° C. and the amounts of C on the amounts of pro-eutectoid cementite precipitated in the central areas of the wire rods in Examples β6 and β9 and Comparative Examples β3 and β4. From the drawing, it can be confirmed that, when the cooling rate Y satisfied (Formula 1), it was possible to suppress pro-eutectoid cementite in the central area of the wire rods to 0.5% or lower.

TABLE 9

| | Steel Type | Elements | | | | | | | | |
|---|---|---|---|---|---|---|---|---|---|---|
| | | C mass % | Si mass % | Mn mass % | P mass % | S mass % | Al mass % | Ti mass % | N ppm | O ppm |
| Example β1 | a-1 | 0.97 | 0.20 | 0.75 | 0.008 | 0.009 | 0.030 | 0.000 | 35 | 21 |
| Example β2 | b-1 | 1.12 | 0.20 | 0.73 | 0.010 | 0.008 | 0.032 | 0.000 | 34 | 23 |
| Example β3 | c | 0.98 | 1.20 | 0.33 | 0.010 | 0.008 | 0.029 | 0.000 | 25 | 38 |
| Example β4 | d | 0.98 | 1.00 | 0.35 | 0.015 | 0.008 | 0.030 | 0.000 | 36 | 38 |
| Example β5 | e | 0.97 | 0.90 | 0.74 | 0.011 | 0.012 | 0.031 | 0.011 | 35 | 24 |
| Example β6 | f-2 | 1.02 | 0.91 | 0.74 | 0.009 | 0.010 | 0.031 | 0.009 | 35 | 24 |
| Example β7 | g-1 | 1.02 | 0.20 | 0.3 | 0.008 | 0.008 | 0.001 | 0.000 | 25 | 21 |
| Example β8 | h | 1.12 | 0.22 | 0.73 | 0.010 | 0.009 | 0.030 | 0.000 | 24 | 24 |
| Example β9 | i | 1.12 | 0.22 | 0.51 | 0.010 | 0.009 | 0.001 | 0.000 | 24 | 24 |
| Example β10 | j-1 | 1.08 | 0.20 | 0.75 | 0.010 | 0.007 | 0.030 | 0.000 | 31 | 28 |
| Example β11 | k | 1.12 | 0.20 | 0.3 | 0.019 | 0.025 | 0.000 | 0.000 | 27 | 25 |
| Example β12 | l | 0.98 | 1.00 | 0.35 | 0.015 | 0.008 | 0.030 | 0.000 | 36 | 38 |
| Example β13 | m | 1.02 | 0.91 | 0.74 | 0.009 | 0.010 | 0.031 | 0.009 | 35 | 24 |
| Example β14 | n | 0.97 | 0.90 | 0.7 | 0.012 | 0.009 | 0.080 | 0.000 | 36 | 26 |
| Example β15 | o | 0.97 | 0.95 | 0.3 | 0.001 | 0.001 | 0.031 | 0.012 | 36 | 26 |
| Example β16 | p | 0.97 | 0.92 | 0.75 | 0.009 | 0.010 | 0.030 | 0.012 | 36 | 26 |

TABLE 10

| | Steel Type | Elements | | | | | | | | | | | | |
|---|---|---|---|---|---|---|---|---|---|---|---|---|---|---|
| | | Cr mass % | Ni mass % | Cu mass % | V mass % | Co mass % | Nb mass % | Mo mass % | W mass % | B ppm | REM | Ca | Mg | Zr |
| Example β1 | a-1 | 0.00 | 0.00 | 0.00 | 0.00 | 0.00 | 0.00 | 0.000 | 0.000 | 0 | 0 | 0 | 0 | 0 |
| Example β2 | b-1 | 0.00 | 0.00 | 0.00 | 0.00 | 0.00 | 0.00 | 0.000 | 0.000 | 0 | 0 | 0 | 0 | 0 |
| Example β3 | c | 0.19 | 0.00 | 0.00 | 0.00 | 0.00 | 0.00 | 0.000 | 0.000 | 0 | 0 | 0 | 0 | 0 |
| Example β4 | d | 0.20 | 0.00 | 0.00 | 0.07 | 0.00 | 0.00 | 0.000 | 0.000 | 0 | 0 | 0 | 0 | 0 |
| Example β5 | e | 0.00 | 0.00 | 0.00 | 0.00 | 0.00 | 0.00 | 0.000 | 0.000 | 10 | 0 | 0 | 0 | 0 |
| Example β6 | f-2 | 0.00 | 0.00 | 0.00 | 0.00 | 0.00 | 0.00 | 0.000 | 0.000 | 8 | 0 | 0 | 0 | 0 |
| Example β7 | g-1 | 0.21 | 0.00 | 0.00 | 0.00 | 0.00 | 0.00 | 0.000 | 0.000 | 0 | 0 | 0 | 0 | 0 |
| Example β8 | h | 0.00 | 0.00 | 0.10 | 0.00 | 0.00 | 0.00 | 0.000 | 0.000 | 0 | 0 | 0 | 0 | 0 |
| Example β9 | i | 0.00 | 0.10 | 0.00 | 0.00 | 0.00 | 0.05 | 0.000 | 0.000 | 0 | 0 | 0 | 0 | 0 |
| Example β10 | j-1 | 0.00 | 0.00 | 0.00 | 0.00 | 0.00 | 0.05 | 0.000 | 0.000 | 0 | 0 | 0 | 0 | 0 |
| Example β11 | k | 0.00 | 0.00 | 0.00 | 0.00 | 0.10 | 0.00 | 0.008 | 0.000 | 0 | 0 | 0 | 0 | 0 |
| Example β12 | l | 0.20 | 0.00 | 0.00 | 0.07 | 0.00 | 0.00 | 0.000 | 0.000 | 8 | 0 | 0 | 0 | 0 |
| Example β13 | m | 0.00 | 0.00 | 0.00 | 0.00 | 0.00 | 0.00 | 0.000 | 0.050 | 9 | 0 | 0 | 0 | 0 |
| Example β14 | n | 0.00 | 0.00 | 0.00 | 0.00 | 0.00 | 0.00 | 0.000 | 0.000 | 0 | 50 | 0 | 0 | 0 |
| Example β15 | o | 0.21 | 0.00 | 0.00 | 0.00 | 0.00 | 0.00 | 0.000 | 0.000 | 0 | 0 | 30 | 0 | 0 |
| Example β16 | p | 0.21 | 0.00 | 0.00 | 0.00 | 0.00 | 0.00 | 0.000 | 0.000 | 9 | 0 | 0 | 20 | 50 |

TABLE 11

| | Steel Type | Elements | | | | | | | | |
|---|---|---|---|---|---|---|---|---|---|---|
| | | C mass % | Si mass % | Mn mass % | P mass % | S mass % | Al mass % | Ti mass % | N ppm | O ppm |
| Comparative Example β1 | j-2 | 1.12 | 0.22 | 0.51 | 0.010 | 0.009 | 0.001 | 0.000 | 24 | 24 |
| Comparative Example β2 | b-2 | 1.12 | 0.20 | 0.73 | 0.010 | 0.008 | 0.032 | 0.000 | 34 | 23 |
| Comparative Example β3 | f-2 | 1.02 | 0.91 | 0.74 | 0.009 | 0.010 | 0.031 | 0.009 | 35 | 24 |
| Comparative Example β4 | a-2 | 0.97 | 0.20 | 0.75 | 0.008 | 0.009 | 0.030 | 0.000 | 35 | 21 |
| Comparative Example β5 | g-2 | 1.02 | 0.20 | 0.3 | 0.008 | 0.008 | 0.001 | 0.000 | 25 | 21 |
| Comparative Example β6 | o | 1.00 | 0.90 | 0.6 | 0.070 | 0.070 | 0.043 | 0.010 | 35 | 22 |
| Comparative Example β7 | r | 0.95 | 0.91 | 0.49 | 0.006 | 0.003 | 0.032 | 0.000 | 40 | 20 |

TABLE 12

| | Steel Type | Elements | | | | | | | | | | | | |
|---|---|---|---|---|---|---|---|---|---|---|---|---|---|---|
| | | Cr mass % | Ni mass % | Cu mass % | V mass % | Co mass % | Nb mass % | Mo mass % | W mass % | B ppm | REM ppm | Ca ppm | Mg ppm | Zr ppm |
| Comparative Example β1 | j-2 | 0.00 | 0.10 | 0.00 | 0.00 | 0.00 | 0.05 | 0.000 | 0.000 | 0 | 0 | 0 | 0 | 0 |
| Comparative Example β2 | b-2 | 0.00 | 0.00 | 0.00 | 0.00 | 0.00 | 0.00 | 0.000 | 0.000 | 0 | 0 | 0 | 0 | 0 |
| Comparative Example β3 | f-2 | 0.00 | 0.00 | 0.00 | 0.00 | 0.00 | 0.00 | 0.000 | 0.000 | 8 | 0 | 0 | 0 | 0 |
| Comparative Example β4 | a-2 | 0.00 | 0.00 | 0.00 | 0.00 | 0.00 | 0.00 | 0.000 | 0.000 | 0 | 0 | 0 | 0 | 0 |
| Comparative Example β5 | g-2 | 0.21 | 0.00 | 0.00 | 0.00 | 0.00 | 0.00 | 0.000 | 0.000 | 0 | 0 | 0 | 0 | 0 |
| Comparative Example β6 | o | 0.00 | 0.20 | 0.00 | 0.00 | 0.00 | 0.10 | 0.000 | 0.000 | 70 | 0 | 0 | 0 | 0 |
| Comparative Example β7 | r | 0.00 | 0.00 | 0.00 | 0.00 | 0.00 | 0.00 | 0.000 | 0.000 | 0 | 0 | 0 | 0 | 0 |

TABLE 13

| | Steel Type | Wire diameter mm | Final temperature (heating temperature in the case of reheating patenting) °C. | Coiling temperature °C. | Temp. of wire rod when starting cooling °C. | Cooling method | Temperature of salt or lead °C. |
|---|---|---|---|---|---|---|---|
| Example β1 | a-1 | 13.0 | 1010 | 970 | 930 | DLP | 510 |
| Example β2 | b-1 | 10.0 | 1020 | 960 | 940 | DLP | 540 |
| Example β3 | c | 16.0 | 1000 | 950 | 905 | DLP | 500 |
| Example β4 | d | 12.5 | 1020 | 970 | 925 | DLP | 545 |
| Example β5 | e | 10.0 | 1030 | 985 | 970 | DLP | 560 |
| Example β6 | f-2 | 8.0 | 1010 | — | 920 | Reheating LP | 600 |

TABLE 13-continued

| | | | | | | | |
|---|---|---|---|---|---|---|---|
| Example β7 | g-1 | 8.0 | 1015 | 955 | 925 | DLP | 540 |
| Example β8 | h | 10.0 | 1020 | 950 | 920 | DLP | 530 |
| Example β9 | i | 12.0 | 1020 | — | 920 | Reheating LP | 550 |
| Example β10 | j-1 | 7.0 | 1050 | 965 | 935 | DLP | 550 |
| Example β11 | k | 5.5 | 1010 | 960 | 925 | DLP | 575 |
| Example β12 | l | 12.5 | 1020 | 925 | 905 | DLP | 550 |
| Example β13 | m | 5.5 | 1030 | 950 | 925 | DLP | 550 |
| Example β14 | n | 12.0 | 1010 | 955 | 925 | DLP | 560 |
| Example β15 | o | 12.0 | 1015 | 960 | 930 | DLP | 550 |
| Example β16 | p | 12.0 | 1010 | 955 | 930 | DLP | 570 |

| | (Formula 1) Right side | Cooling rate 900→650° C. ° C./s | Strength of rolled material MPa | Area ratio of pearlite % | Area ratio of pro-eutectoid θ in the surface layer area of wire rod % | Area ratio of pro-eutectoid θ in the central area of wire rod % |
|---|---|---|---|---|---|---|
| Example β1 | — | — | 1394 | 98.1 | 0.05 | 0.20 |
| Example β2 | — | — | 1549 | 98.5 | 0.16 | 0.40 |
| Example β3 | — | — | 1599 | 99.1 | 0.12 | 0.28 |
| Example β4 | — | — | 1530 | 98.6 | 0.11 | 0.38 |
| Example β5 | — | — | 1544 | 97.3 | 0.22 | 0.35 |
| Example β6 | 20.1 | 30.0 | 1620 | 98.3 | 0.15 | 0.39 |
| Example β7 | — | — | 1426 | 98.2 | 0.12 | 0.26 |
| Example β8 | — | — | 1562 | 97.3 | 0.48 | 0.49 |
| Example β9 | 46.2 | 55.0 | 1511 | 98.6 | 0.42 | 0.48 |
| Example β10 | — | — | 1559 | 99.1 | 0.35 | 0.29 |
| Example β11 | — | — | 1559 | 97.2 | 0.26 | 0.36 |
| Example β12 | — | — | 1526 | 97.5 | 0.05 | 0.28 |
| Example β13 | — | — | 1698 | 97.3 | 0.31 | 0.42 |
| Example β14 | — | — | 1620 | 97.1 | 0.03 | 0.01 |
| Example β15 | — | — | 1591 | 98.2 | 0.00 | 0.00 |
| Example β16 | — | — | 1621 | 97.6 | 0.02 | 0.01 |

TABLE 14

| | Steel Type | Diameter of Final drawn wire mm | TS of Final drawn wire MPa | Area ratio of pro-eutectoid θ in the surface layer area of steel wire % | Area ratio of pro-eutectoid θ in the central area of steel wire % | Wire breakage during wire drawing | Delamination | Remark |
|---|---|---|---|---|---|---|---|---|
| Example β1 | a-1 | 5.4 | 2120 | 0.00 | 0.12 | Not occur | Not occur | Bluing after wire drawing |
| Example β2 | b-1 | 4.2 | 2286 | 0.14 | 0.35 | Not occur | Not occur | Heat stretching after wire drawing |
| Example β3 | c | 6.7 | 2126 | 0.10 | 0.22 | Not occur | Not occur | Heat stretching after wire drawing |
| Example β4 | d | 5.2 | 2257 | 0.09 | 0.30 | Not occur | Not occur | Heat stretching after wire drawing |
| Example β5 | e | 4.2 | 2270 | 0.15 | 0.28 | Not occur | Not occur | After wire drawing, molten 5% Al—Zn plating and another wire drawing |
| Example β6 | f-2 | 3.3 | 2351 | 0.10 | 0.30 | Not occur | Not occur | Bluing after wire drawing |
| Example β7 | g-1 | 3.3 | 2156 | 0.05 | 0.19 | Not occur | Not occur | Wire drawing after molten 10% Al—Zn plating |
| Example β8 | h | 4.2 | 2299 | 0.43 | 0.41 | Not occur | Not occur | As the drawn wire is |
| Example β9 | i | 5.0 | 2248 | 0.39 | 0.42 | Not occur | Not occur | After wire drawing, molten zinc plating and another wire drawing |
| Example β10 | j-1 | 2.9 | 2294 | 0.26 | 0.21 | Not occur | Not occur | Wire drawing after molten zinc plating |
| Example β11 | k | 2.3 | 2296 | 0.19 | 0.29 | Not occur | Not occur | Wire drawing after molten zinc plating |
| Example β12 | l | 5.2 | 2254 | 0.03 | 0.25 | Not occur | Not occur | Heat stretching after wire drawing |
| Example β13 | m | 2.3 | 2428 | 0.22 | 0.36 | Not occur | Not occur | Wire drawing after molten zinc plating |
| Example β14 | n | 5.0 | 2196 | 0.01 | 0.00 | Not occur | Not occur | Molten lead plating and heat stretching after wire drawing |
| Example β15 | o | 5.0 | 2168 | 0.00 | 0.00 | Not occur | Not occur | Molten zinc plating after wire drawing |
| Example β16 | p | 5.1 | 2181 | 0.01 | 0.00 | Not occur | Not occur | Molten zinc plating after wire drawing |

TABLE 15

| | Steel Type | Wire diameter mm | Final temperature (heating temperature in the case of reheating patenting) ° C. | Coiling temperature ° C. | Temp. of wire rod when starting cooling ° C. | Cooling method | Temperature of salt or lead ° C. |
|---|---|---|---|---|---|---|---|
| Comparative Example β1 | j-2 | 11.0 | 1030 | 875 | <u>850</u> | DLP | 550 |
| Comparative Example β2 | b-2 | 11.0 | <u>960</u> | 930 | 910 | DLP | 550 |
| Comparative Example β3 | f-2 | 12.0 | 1030 | 985 | 945 | Stelmor | — |

TABLE 15-continued

| | | | | | | | |
|---|---|---|---|---|---|---|---|
| Comparative Example β4 | a-2 | 13.0 | 1035 | 985 | 940 | Stelmor | — |
| Comparative Example β5 | g-2 | 8.0 | 1035 | 825 | 800 | DLP | 550 |
| Comparative Example β6 | o | 12.0 | 1035 | 950 | 900 | DLP | 550 |
| Comparative Example β7 | r | 11.0 | 950 | — | 890 | Reheating LP | 540 |

| | (Formula 1) Right side | Cooling rate 900→650° C. ° C./s | Strength of rolled material MPa | Area ratio of pearlite % | Area ratio of pro-eutectoid θ in the surface layer area of wire rod % | Area ratio of pro-eutectoid θ in the central area of wire rod % |
|---|---|---|---|---|---|---|
| Comparative Example β1 | — | — | 1515 | 98.2 | 0.70 | 0.02 |
| Comparative Example β2 | — | — | 1531 | 97.3 | 0.62 | 0.04 |
| Comparative Example β3 | 20.1 | 15.0 | 1450 | 99.3 | 0.60 | 1.60 |
| Comparative Example β4 | 13.2 | 8.0 | 1240 | 99.1 | 0.40 | 1.20 |
| Comparative Example β5 | — | — | 1420 | 97.5 | 1.32 | 0.05 |
| Comparative Example β6 | — | — | 1460 | 97.2 | 1.56 | 0.40 |
| Comparative Example β7 | — | — | 1440 | 97.2 | 0.65 | 0.30 |

TABLE 16

| | Steel Type | Diameter of Final drawn wire mm | TS of Final drawn wire MPa | Area ratio of pro-eutectoid θ in the surface layer area of steel wire % | Area ratio of pro-eutectoid θ in the central area of steel wire % | Wire breakage during wire drawing | Delamination | Remark |
|---|---|---|---|---|---|---|---|---|
| Comparative Example β1 | j-2 | 4.6 | 2252 | 0.62 | 0.00 | Not occur | Occur | Heat stretching after wire drawing |
| Comparative Example β2 | b-2 | 4.6 | 2268 | 0.52 | 0.00 | Not occur | Occur | Bluing after wire drawing |
| Comparative Example β3 | f-2 | Wire breakage occurs | — | — | — | Occur | — | Wire drawing after molten zinc plating |
| Comparative Example β4 | a-2 | Wire breakage occurs | — | — | — | Occur | — | Wire drawing after molten zinc plating |
| Comparative Example β5 | g-2 | 3.3 | 2150 | 1.20 | 0.00 | Not occur | Occur | Wire drawing after molten zinc plating |
| Comparative Example β6 | o | 5.3 | 2030 | 1.43 | 0.00 | Not occur | Occur | Molten zinc plating after wire drawing |
| Comparative Example β7 | r | 5.0 | 2040 | 0.52 | 0.25 | Not occur | Occur | As the drawn wire is |

INDUSTRIAL APPLICABILITY

According to the invention, it is possible to provide with high productivity and favorable yield rate at a low price high strength wire rods that are preferable for use as a steel cord, a sewing wire, a PC steel wire, a zinc plated steel strand, a steel wire for springs, a cable for suspension bridges, or the like, and are excellent in terms of wire drawing properties, which makes the invention have broad industrial applicability.

The invention claimed is:

1. A steel wire obtained by performing at least once a wire drawing and a reheating patenting treatment on a wire rod with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities, in which 97% or more of an area in a cross-section perpendicular to the longitudinal direction of the wire rod is occupied by a pearlite, and 0.5% or less of an area in a central area of the cross-section and 0.5% or less of an area in a first surface layer area in the cross-section are occupied by a pro-eutectoid cementite, wherein:

the steel wire has a diameter of 0.1-0.4 mm and a tensile strength of 4200 MPa or higher; and 0.5% or less of an area in a second surface layer area in the cross-section perpendicular to the longitudinal direction of the steel wire is occupied by a pro-eutectoid cementite.

2. A steel wire obtained by drawing a wire rod with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities, in which 97% or more of an area in a cross-section perpendicular to the longitudinal direction of the wire rod is occupied by a pearlite, and 0.5% or less of an area in a central area in the cross-section and 0.5% or less of an area in a first surface layer area in the cross-section are occupied by a pro-eutectoid cementite, wherein:

the steel wire has a diameter of 0.8-8 mm and a tensile strength of 1800 MPa or higher; and 0.5% or less of an area in a third surface layer area in the cross-section perpendicular to the longitudinal direction of the steel wire is occupied by a pro-eutectoid cementite.

3. The steel wire according to claim 2, further comprising:
a molten zinc plating or a molten zinc alloy plating which is coated with the third surface layer.

4. A method of manufacturing the steel wire according to claim 1, comprising:
manufacturing a wire rod with a diameter of 3-7 mm by hot-rolling a billet with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities, coiling the rolled wire rod at a temperature of 950° C. or higher, and performing a patenting treatment by immersing the rolled wire rod of 900° C. or higher into a molten salt bath at a temperature of 500° C.-600° C.;
drawing the wire rod;
performing a second patenting treatment by starting cooling by introducing the drawn rolled wire rod of 900° C. or higher into a lead bath or a fluidized bed at a temperature of 500° C.-600° C.; and
performing cold wire drawing on the wire rod which has been subjected to the second patenting treatment.

5. A method of manufacturing the steel wire according to claim 1, comprising:
manufacturing a wire rod with a diameter of 3-7 mm by producing a rolled wire rod by hot-rolling a billet with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities, coiling the rolled wire rod at a temperature of 950° C. or higher, and performing a patenting treatment by starting cooling of the rolled wire rod of 900° C. or higher, quenching the rolled wire rod in a manner that a cooling rate Y for cooling the rolled wire rod from 900° C. to 650° C. is controlled to satisfy Formula 1, and finishing a pearlite transformation at a temperature of 650° C.-500° C.;
drawing the wire rod;
performing a second patenting treatment by starting cooling by introducing the drawn rolled wire rod of 900° C. or higher into a lead bath or a fluidized bed at a temperature of 500° C.-600° C.; and
performing cold wire drawing on the wire rod which has been subjected to the second patenting treatment;

$$Y \geq \exp((C\% - 0.66)/0.12) \quad \text{Formula 1.}$$

6. A method of manufacturing the steel wire according to claim 1, comprising:
manufacturing a wire rod with a diameter of 3-7 mm by reheating a wire rod with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities and a diameter of 3 mm to 7 mm to a temperature of 950° C.-1050° C., starting cooling of the reheated wire rod of 900° C. or higher, and performing a patenting treatment using a lead bath or a fluidized bed at a temperature of 500° C.-600° C.;
drawing the wire rod;
performing a second patenting treatment by starting cooling by introducing the drawn wire rod of 900° C. or higher into a lead bath or a fluidized bed at a temperature of 500° C.-600° C.; and
performing cold wire drawing on the wire rod which has been subjected to the second patenting treatment.

7. A method of manufacturing the steel wire according to claim 2, comprising:
manufacturing a wire rod with a diameter of 5-16 mm by hot-rolling a billet with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities, so as to manufacture a rolled wire rod, coiling the rolled wire rod at a temperature of 950° C. or higher, and performing a patenting treatment by immersing the rolled wire rod of 900° C. or higher into a molten salt bath at a temperature of 500° C.-600° C.; and
drawing the wire rod.

8. A method of manufacturing the steel wire according to claim 2, comprising:
manufacturing a wire rod with a diameter of 5-16 mm by hot-rolling a billet with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co: 0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities so as to manufacture a rolled wire rod, coiling the rolled wire rod at a temperature of 950° C. or higher, and performing a patenting treatment by starting cooling of the rolled wire rod of 900° C. or higher, quenching the rolled wire rod in a manner that a cooling rate Y for cooling the rolled wire rod from 900° C. to 650° C. is controlled to satisfy Formula 1, and finishing a pearlite transformation at a temperature of 650° C.-500° C.; and
drawing the wire rod;

$$Y \geq \exp((C\% - 0.66)/0.12) \quad \text{Formula 1.}$$

9. A method of manufacturing the steel wire according to claim 2, comprising:
manufacturing a wire rod with a diameter of 5-16 mm by preparing a rolled wire rod with a composition including: C: 1.12-1.30 mass %; Si: 0.1-1.5 mass %; Mn: 0.1-1.0 mass %; Al: 0-0.1 mass %; Ti: 0-0.1 mass %; P: 0-0.02 mass %; S: 0-0.02 mass %; N: 10-50 ppm; 0: 10-40 ppm; Cr: 0-0.5 mass %; Ni: 0-0.5 mass %; Co:

0-0.5 mass %; V: 0-0.5 mass %; Cu: 0-0.5 mass %; Nb: 0-0.1 mass %; Mo: 0-0.2 mass %; W: 0-0.2 mass %; B: 0-30 ppm; REM: 0-50 ppm; Ca: 0-50 ppm; Mg: 0-50 ppm; Zr: 0-100 ppm; and the balance including Fe and inevitable impurities and a diameter of 5-16 mm, reheating the rolled wire rod to a temperature of 950° C.-1050° C., and performing a patenting treatment by starting cooling of the rolled wire rod of 900° C. or higher using a lead bath or a fluidized bed at a temperature of 500° C.-600° C.; and drawing the wire rod.

10. The steel wire according to claim 2, wherein the amount of Al in the composition is 0.003-0.1 mass %.

11. The steel wire according to claim 1, wherein the second surface layer area is free of cracks.

12. The steel wire according to claim 2, wherein the third surface layer area is free of cracks.

13. The method of manufacturing the steel wire according to claim 7, further comprising at least one selected from the group consisting of (a), (b), and (c), wherein (a) includes performing one selected from the group consisting of bluing, heat stretching, molten zinc plating, and molten zinc alloy plating after drawing the wire rod;

wherein (b) includes performing one selected from the group consisting of molten zinc plating and molten zinc alloy plating between manufacturing the wire rod and drawing the wire rod; and wherein (c) includes performing one selected from the group consisting of molten zinc plating and molten zinc alloy plating after drawing the wire rod and further drawing the drawn wire rod.

14. The method of manufacturing the steel wire according to claim 8, further comprising at least one selected from the group consisting of (a), (b), and (c), wherein (a) includes performing one selected from the group consisting of bluing, heat stretching, molten zinc plating, and molten zinc alloy plating after drawing the wire rod;

wherein (b) includes performing one selected from the group consisting of molten zinc plating and molten zinc alloy plating between manufacturing the wire rod and drawing the wire rod; and wherein (c) includes performing one selected from the group consisting of molten zinc plating and molten zinc alloy plating after drawing the wire rod and further drawing the drawn wire rod.

15. The method of manufacturing the steel wire according to claim 9, further comprising at least one selected from the group consisting of (a), (b), and (c), wherein (a) includes performing one selected from the group consisting of bluing, heat stretching, molten zinc plating, and molten zinc alloy plating after drawing the wire rod;

wherein (b) includes performing one selected from the group consisting of molten zinc plating and molten zinc alloy plating between manufacturing the wire rod and drawing the wire rod; and wherein (c) includes performing one selected from the group consisting of molten zinc plating and molten zinc alloy plating after drawing the wire rod and further drawing the drawn wire rod.

16. The method of manufacturing the steel wire according to claim 4, wherein the rolled wire rod is coiled at a temperature of 955° C. or higher.

17. The method of manufacturing the steel wire according to claim 6, wherein the rolled wire rod is reheated to a temperature of 1010° C.-1050° C.

18. The method of manufacturing the steel wire according to claim 7, wherein the rolled wire rod is coiled at a temperature of 955° C. or higher.

19. The method of manufacturing the steel wire according to claim 9, wherein the rolled wire rod is reheated to a temperature of 1010° C.-1050° C.

* * * * *